United States Patent
Tupper et al.

(10) Patent No.: US 10,506,764 B2
(45) Date of Patent: Dec. 17, 2019

(54) PRUNER CLEANER

(71) Applicant: Clean Scissors LLC, Grass Valley, CA (US)

(72) Inventors: Robert R Tupper, The Dalles, OR (US); David Timoney, Grass Valley, CA (US)

(*) Notice: Subject to any disclaimer, the term of this patent is extended or adjusted under 35 U.S.C. 154(b) by 0 days.

(21) Appl. No.: 16/403,480

(22) Filed: May 3, 2019

(65) Prior Publication Data
US 2019/0254237 A1     Aug. 22, 2019

Related U.S. Application Data

(63) Continuation-in-part of application No. 16/012,493, filed on Jun. 19, 2018, now Pat. No. 10,293,382.

(60) Provisional application No. 62/815,206, filed on Mar. 7, 2019, provisional application No. 62/530,461, filed on Jul. 10, 2017.

(51) Int. Cl.
| | |
|---|---|
| *A01G 3/08* | (2006.01) |
| *B08B 1/04* | (2006.01) |
| *B08B 1/00* | (2006.01) |

(52) U.S. Cl.
CPC ............... *A01G 3/08* (2013.01); *B08B 1/002* (2013.01); *B08B 1/04* (2013.01)

(58) Field of Classification Search
CPC .............. A01G 3/08; B08B 1/002; B08B 1/04
See application file for complete search history.

(56) References Cited

U.S. PATENT DOCUMENTS

| | | | | |
|---|---|---|---|---|
| 2,472,155 | A * | 6/1949 | Gaino | A47L 4/00 15/77 |
| 5,600,861 | A * | 2/1997 | Saito | A46B 13/008 15/21.1 |
| 6,286,525 | B1 * | 9/2001 | Nishimura | B08B 1/04 134/153 |
| 9,885,195 | B1 * | 2/2018 | Hayes | E04H 4/1654 |

* cited by examiner

*Primary Examiner* — Christopher R Harmon

(57) ABSTRACT

A pruner cleaning machine scrubs gummy sap and foreign matter from pruner blades inserted into its cleaning chamber. The machine includes a motor turning a drive shaft having scrubbers coupled thereon. The scrubbers have scrubbing surfaces facing each other and a scrubber barrel resides between the scrubbers.

The motor is electronically controlled to provide adjustable regimens of duty cycles of scrubbing in forward and reverse directions and various speeds, and status lights may indicate power available, selected options, and in-process phases and completion of a cleaning regimen.

14 Claims, 13 Drawing Sheets

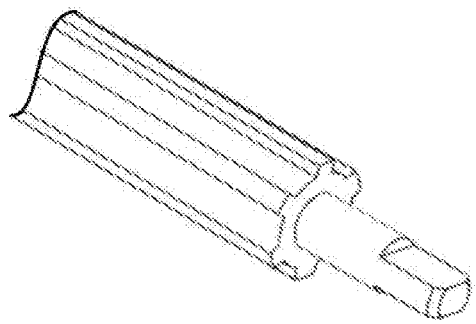
Fig. 9c
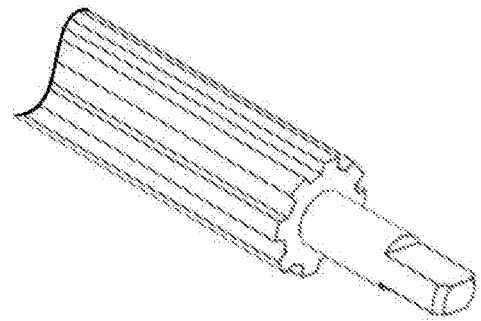
Fig. 9d
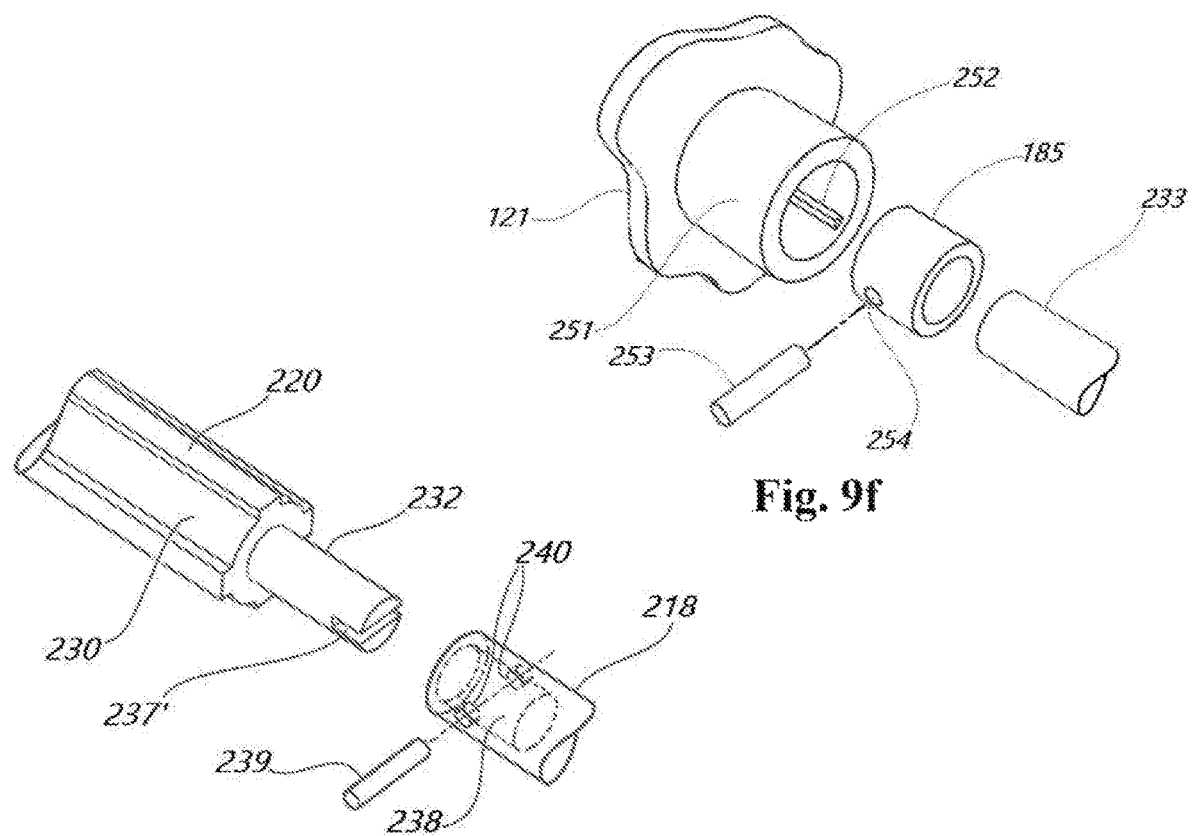
Fig. 9f
Fig. 9e

PRUNER CLEANER

PRIORITY: CROSS-REFERENCE TO THE RELATED APPLICATION

This non-provisional utility patent application is a continuation in part of non-provisional utility patent application Ser. No. 16/012,493 "Plant Trimming Shear Cleaner and Sharpener," filed 19 Jun. 2018, and this application claims all available benefits of priority to its parent application.

The parent application, non-provisional utility patent application Ser. No. 16/012,493 "Plant Trimming Shear Cleaner and Sharpener," was filed 19 Jun. 2018, and claims the benefit of and priority to U.S. Provisional Application 62/530,461 "Plant Trimming Shear Cleaner and Sharpener," filed 10 Jul. 2017.

This application also claims the benefit of and priority to U.S. Provisional Application 62/815,206 "Pruner Cleaner," filed 6 Mar. 2019.

The entire contents of U.S. Provisional Application 62/530,461 "Plant Trimming Shear Cleaner and Sharpener," filed 10 Jul. 2017, U.S. Provisional Application 62/815,206 "Pruner Cleaner," filed 6 Mar. 2019, and non-provisional utility patent application Ser. No. 16/012,493 "Plant Trimming Shear Cleaner and Sharpener," filed 19 Jun. 2018 are hereby incorporated into this application document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates generally to a plant trimming shear cleaner and sharpener.

BACKGROUND OF THE INVENTION

Many types of plants have thick, viscous, or gummy sap or resin in their stalks and other parts, and when trimming, pruning, or harvesting, the shearing or cutting tools used often accumulate sticky residues which can in turn pick up other foreign matter such as dust, fines, or clippings. Over time the tool becomes increasing difficult to use or to control safely, halting the work while the tool is cleaned. Currently there are a number of methods used to attempt to clean off sticky residue from shears, pruners, or gardening scissors. One of set of methods involves soaking a fouled tool or at least the cutting blades or edges of the tool in a cleaning solution, or oil impregnated sand, or other sorts and mixtures of solvents or abrasives, but these methods fail to satisfy market needs because of how long the trimmers need to be soaked or cycled within the cleaning medium, and the additional steps required to remove gritty abrasive cleaners before returning the tool to service.

Attempts to sharpen gummed up plant trimming shears are often inadequate because although sharpening may remove gummy residue and foreign matter from the immediate area of the tool's cutting surfaces, the rest of the tool will remain substantially fouled. Worse, gummy residues transferred to the sharpening tool will impede subsequent sharpening attempts. Eventually both the cutting tools and the sharpening tools alike will still need to be cleaned.

Working on resinous plants with cutting or pruning tools requires more frequent instances of cleaning and sharpening the tools, and it is often attempted to devise portable cleaning and sharpening tools which can be worn by a gardener or field worker or kept close by a site where pruning, cutting, or harvesting is in progress.

Cleaning scissors by hand usually requires rags, open containers of solvents and presents uses with cutting hazards. Contaminated rags may contribute to impurities in valuable products. Where cleaning solvents are used, evaporation, odors, ventilation contribute additional challenges and opportunities for hazards and waste, and users may be exposed to undesired contact with these cleaning agents and plant materials or their extracts suspended therein in the event of a spill or a leak.

Where purity of plant extracts is an objective, contamination becomes a concern because a used rag can transfer contaminants or fine matter between supposedly clean tools. When harvesting plants for medical compounds, people who clean the cutting tools risk receiving a transfer of active agents in plant oils into the body, which can precipitate allergic reactions or an unintended dose of psychotropic medicinal compounds, or unwanted hormonal responses to chemicals intended to alleviate medical conditions not present in an affected user.

BRIEF SUMMARY OF THE INVENTION

From the aforementioned background it is understood that many objectives exist for a device for cleaning pruners, clippers, shears, or other gardening or harvesting tools used with plants that exude any sort of viscous, sticky saps or resins likely to gum up the mechanical workings of such a cutting tool.

Thus, a primary objective of the invention is to provide an apparatus that scrubs plant trimming shears and removes residues from blades rather than having them transferred into a rag which can then contaminate other tools.

A corollary objective of the invention is to provide motive power to moving parts of scrubbing and blade cleaning components and mechanisms of the invention. Another corollary objective of the invention is to ensure scrubbing materials contact and clean most if not all shearing surfaces of an inserted pruning tool. Another corollary objective of the invention is to provide scrubbing motions and durations in regimens which effectively clean the inserted tool.

Another objective of the invention is to present a cleaning solution or solvent to fouled portions of the tool or at least the cutting surfaces thereof. A corollary objective of the invention is to separate unwanted, gummy residue from cutting surfaces and mechanisms of the cutting tool, by mechanical actions or chemical actions or both.

Another objective of the invention is to provide means for a pruner cleaning apparatus to be kept nearby and ready to clean a pruner in a variety of workspaces including not only work benches but also near anywhere pruning work is in progress, such as on a ladder.

Another objective of the invention is to reduce or prevent loss or spillage of cleaning solution retained in a reservoir within the tool cleaning device. A corollary objective of the invention is to close admittance to or egress from the reservoir when the device is not in use.

Another objective of the invention is to protect the user from contact with any mechanisms or components of the device which may present an opportunity for injury or damage such as pinching hazards, exposed surfaces or edges of sharpening tools especially while in motion, or powered reciprocating or rotating machinery that may catch and wind up clothing or other foreign objects.

A further objective of the invention is to provide a machine having portions which are easy to disassemble so as to allow access for exchanging scrubbing components when these become worn, reconfiguring brushes or discs of various bristle configurations or degrees of abrasiveness, or adjusting the spacing between scrubbing components for pruners having various blade configurations. A corollary objective is to provide internal cowlings or shrouds which are difficult or non-intuitive to remove, so as to protect precision, factory adjusted mechanisms, circuit boards, and high energy wiring from unauthorized meddling.

Various devices are currently available which attempt to address these challenges, although they may at best meet only one or two aspects of the totality of the requirements.

BRIEF DESCRIPTION OF THE DRAWINGS

A further understanding of the nature and advantages of particular embodiments may be realized by reference to the remaining portions of the specification and the drawings. Similar reference numerals are used to refer to similar components.

FIG. 9c shows a drive shaft in accordance with the invention having six splines.

FIG. 9d shows a drive shaft in accordance with the invention having eight splines.

FIG. 9e shows an embodiment of a coupling from a motor output or gear train output shaft to a proximal end of a drive shaft in accordance with the invention.

FIG. 9f shows a portion of a half housing or housing extension receiving a bushing or journal for retaining a distal end of a drive shaft in accordance with the invention.

FIG. 16b shows an end view of the driven plate, springs, mount block, bumper stops, and other flex coupling components housed within the outer housing of the embodiment shown in FIG. 16a.

DETAILED DESCRIPTION OF THE INVENTION

Figure 1:
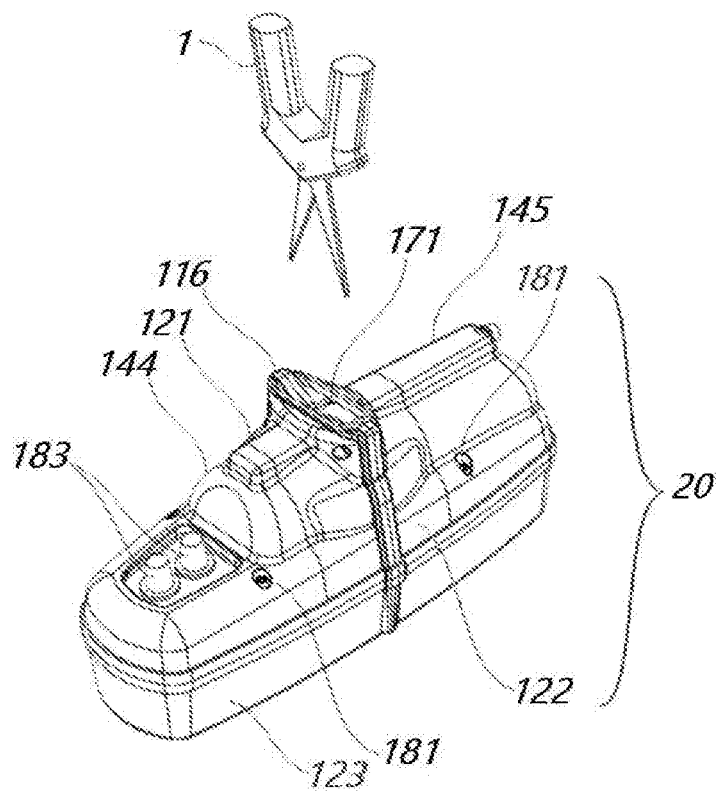
FIG. 1 shows an oblique, top left front view of an embodiment of the invention, with a set of pruners positioned above a cleaning orifice.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this specification, the term "means for . . . " as used herein including the claims, is to be interpreted according to 35 USC 112 paragraph 6. Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this specification any singular grammatical gender may subsume any other singular grammatical gender in all cases, and any plural grammatical gender may subsume any other plural grammatical gender in all cases. A user of the invention may be of any biological sex, thus all instances where "he," "his," or "him" are written may be replaced by "she," or "her," as appropriate, to equivalent meaning, effects, intents, and purposes. Also, grammatically irregular plural forms are recognized as their plain language equivalents, so that terms such as "at least one foot" are understood to be equivalent to "both feet" and other similar phrases of equivalent meaning.

"Pruner" in this specification includes any and all manner of hand-operated gardening tools designed to cut plant parts such as stems, leaves, stalks, twigs, and branches and the like, mostly by means of bringing together two slightly offset blades to rupture the material being cut by shearing stress overcoming the material strength. "Pruners" in this specification also include scissors, shears, clippers, and other similar hand operated devices having at least two handles or levers connected by a pin so that a grasping hand can pinch and sever plant matter by means of the tool's cutting blades operating at a mechanical advantage which multiplies the user's grasping or clenching force.

Some plants exude gummy sap or other highly viscous or sticky fluids which transfer to a cutting tool during pruning, harvesting, or maintenance performed on plants. The gummed-up tool is harder to operate safely and effectively. In one class of embodiments, the invention is a pruner cleaner available in several embodiments, some being portable on the person for workers doing landscaping, harvesting, or pruning chores, and others being designed for use at a workbench or table where a person can clean batches of fouled tools and return them into service. A portable embodiment may include a clip or attachment for affixing the pruner cleaning machine to a ladder tread, vehicle tailgate, or other such surface for mobile work.

A pruner cleaning machine scrubs gummy sap and foreign matter from pruner blades inserted into its cleaning chamber. The machine includes a motor turning a driveshaft having scrubbers coupled thereon. The scrubbers have scrubbing surfaces facing each other and a scrubber barrel resides between the scrubbers.

The invention replaces an inefficient, one-handed cleaning process which is seldom performed effectively or completely. Existing practice which the invention improves on and substantially eliminates is a generally unstructured and poorly controlled process whereby three or four fouled pruners are dropped into glass jars and left to soak for uncontrolled durations of time.

Since cleaning fluids are deposited into open jars the use of highly volatile but otherwise effective solvents is precluded because of loss by evaporation and spill risks. Thus the jar soak method is limited to heavier oils such as salad oil which may be less effective than d-limonene or 90% ethanol, or other volatile cleaners such as methanol, turpentine, methyl-ethyl ketone, kerosene, or denatured alcohol.

Rapid evaporation of volatile but effective solvents is not only needlessly expensive but may also expose workers to organic compounds in a vapor state which cause unwanted effects or health hazards when inhaled. Some states may also impose legal limits on generating evaporated volatile organic compounds (VOCs) and have occupational safety codes governing how these products may be used indoors.

Another hazard is that prolonged contact with volatile solvents can draw the water out of workers' skin. Workers grasping plant matter to be pruned with one hand typically pull out a pruner that has been soaking a while with the other hand, and clean it off onto a rag in a one-handed motion which most often only swabs the flats of the pruning blades. Usually there is little control governing whether or not the first pruner pulled from the solvent was the first pruner to be inserted (FIFO) and little to ensure that all pruners are soaked for similar amounts of time as a cleaning treatment step.

After swiping the wide faces of the pruner blades onto a cleaning rag and flipping them over in one hand to swipe the other wide sides of the blades, the person must then rotate the pruner 90° and then 270° in order to clean all four active surfaces of a cutting tool.

Because of the cumbersome hand motions and the additional time required workers usually neglect to clean the edges of the blade, which are its most important cutting surfaces. Workers are typically unwilling to spend more than 30 seconds cleaning a tool or wiping off solvents, and over time rags containing accumulated foulings instead of cleaning the next set of pruners, begin to contaminate them with gunk from previously cleaned tools.

In contrast, by using the invention, a pruner can be inserted and cleaned much more quickly such as in the range of about 10-12 seconds, and immediately returned into service, with only an optional wipe-down to remove solvent on pruners which have already been completely cleaned in the machine. The invention thus eliminates the most tedious portion of the cleaning task which is also the task least often attempted and least often completed successfully: that of cleaning the most important cutting surface of the pruner which are its leading edges of the cutting blades.

The cutting edges typically face each other within an acute angle of the open jaws of a pruner, which means they are the least accessible to traditional swabbing methods which use rags or tools, and also inhere the most risk of accidental lacerations, a risk which increases when work is done hurriedly and unfastidiously. A thorough and careful cleaning of pruners by hand usually takes about five minutes.

In a typical mode of operation, the invention may thus save about 10-15 minutes per hour of non-productive overhead work and its associated labor cost to a business. In another example, if workers clean tools about 12 times an hour and spend 30 seconds on each tool while often getting incomplete results, use of the inventive machine eliminates two thirds of the time spent cleaning tools.

The inventive machine is also a lot less messy and eliminates workers needing to move their fingers near sharp cutting edges, because the edges are enclosed safely within the housings of the machine while cleaning is in progress.

At most, the workers only need move the pruner up and down within the machine and optionally only apply light lateral pressure, or apply a twist, or a light squeeze to the pruner handles to engage the blades with the scrubbers inside the cleaning chamber of the machine.

The motor is electronically controlled to provide adjustable regimens of duty cycles of scrubbing in forward and reverse directions and at various speeds, and status lights may indicate power available, selected options, and in-process phases and completion of a cleaning regimen.

The apparatus fulfills the need for a shear soaking and cleaning device. The invention is reusable. Among other things, it is an advantage of the invention to provide a plant trimming shear cleaner and sharpener that does not suffer from any of the problems or deficiencies associated with prior solutions. Some embodiments include a battery operated motor. A motor may be controlled by a pulse width modulator, because this means of motor control retains high torque at low speeds, or a motor may be a stepper motor.

Referring to the figures, FIG. 1 shows an oblique top left front view of an embodiment of the invention [20,] with a set of pruners [1] positioned above a pruner receiving orifice [171.] Two half-housings [121] and [122] are roughly symmetrical about a midplane and have a midplane seal [116] clamped between them, and each half housing has a shroud or housing extension affixed to it distal to the midplane. A housing extension may also be called a cowling. Extension [144] attaches to half-housing [121] and includes a cutout or a sunken well area where control knobs [183] are accessible to a user. The control knobs may control motor operations such as duration, operating intervals, or motor modes such as reversing, or may be a multiple position selector switch for selecting from a set of operating modes. Extension [145] attaches to half-housing [122.] The housing extensions include sites where they may be attached to a lower well [123] such as by cap screws or other hardware. At the discretion of a manufacturer, detaching a half-housing and its attached extension from the lower well may or may not be an authorized service.

From the user's point of view, the extensions are permanently mounted to their housings, such as by adhesives or by threaded hardware which can be disassembled for authorized service. Stickers or seals may be affixed across the interface of a half housing and its extension so that tampering or unauthorized disassembly may be evinced and trigger a cancellation of warranty or other rescission of manufacturer's support or good will. Stickers or seals may also be affixed across enclosures which house or contain electronics for reduction of liability in the event that unauthorized access or tampering leads to a malfunction or other event leading to product liability litigation.

The midplane seal of the pruner cleaning machine may comprise an elastomer. In this specification, an "elastomer" includes materials such as natural and synthetic rubbers, EPDM, TPR, buna-n, Perbunan, acrylo-nitrile butadiene rubber, and other butyl and nitrile materials. The seal may be affixed to one or the other housing by an adhesive or a mechanical interlock such as a gland on the seal received into a groove in a housing part.

The pruner receiving orifice is designed to retain a pruner in rigid or preferably flexible engagement of the pruner blades with the blade cleaners in motion within the pruner cleaning machine. The cleaning chamber of the pruner cleaning machine comprises the abutted half-housings, the midplane seal, and lead-in or pruner retention features in or near the pruner receiving orifice may also include locking means to receive a pruning tool and retain said pruning tool in a retention position. The midplane seal is interposed between the left and right half-housings to form a fluid-tight basin or reservoir for cleaning solution. A seal may be a gasket or any elastomeric material compressed between a left housing and a right housing. A seal may have a closed contour or an open contour. A preferred embodiment of a pruner receiving orifice orients a blade surface of a pruner received therein parallel to or at an angle, such as between 0° and 40° inclusive relative to said center plane.

Figure 2:
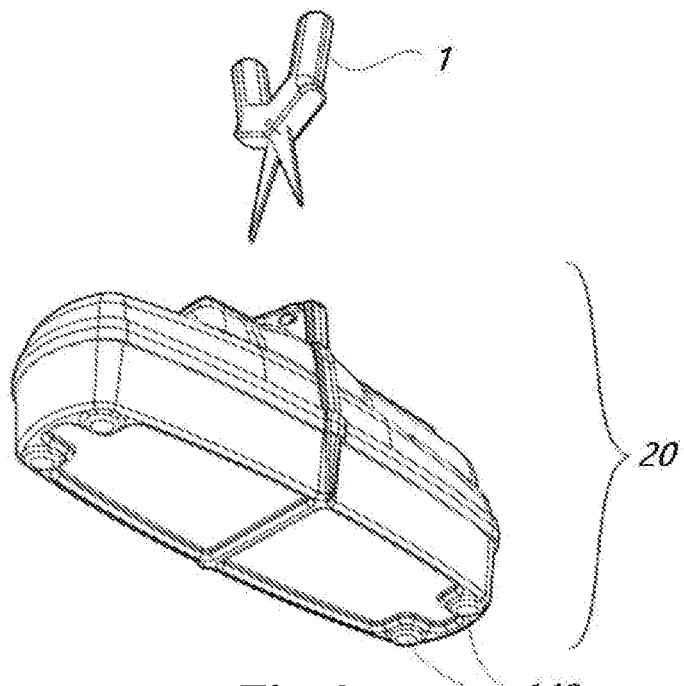
FIG. 2 shows an oblique, bottom left front view of the embodiment of FIG. 1.

FIG. 2 shows an oblique, bottom left front view of the embodiment of FIG. 1. In this view, the pruner is positioned above the machine ready to be inserted, and the lower well of the machine includes a plurality of feet [149] which may be downward-protruding bosses molded in or stamped into the lower well. Feet may optionally include discs of fabric or elastomer material affixed to or mechanically attached to these bosses.

Figure 3:
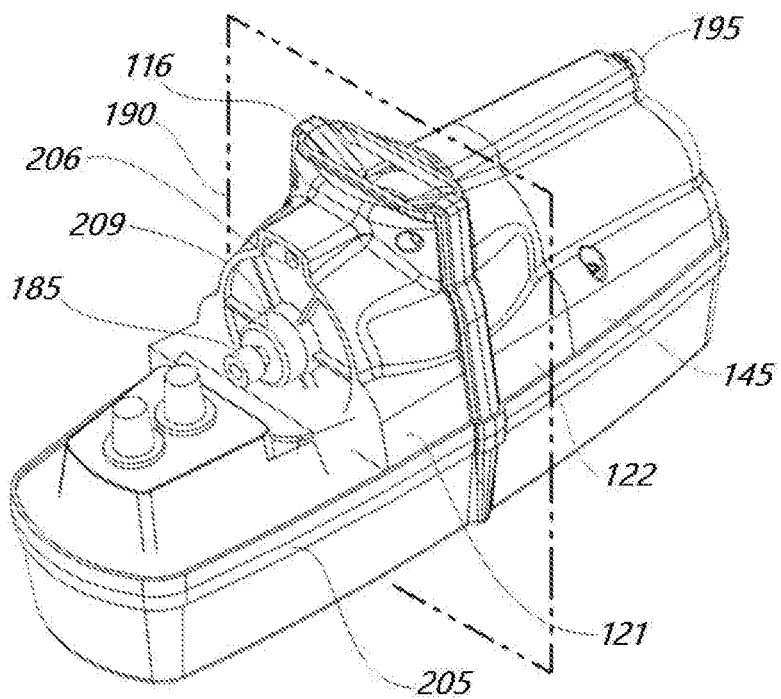
FIG. 3 shows an oblique, top left front view of an embodiment of the invention with one of the housing extensions removed to reveal some drive shaft components of the invention.

FIG. 3 shows an oblique, top left front view of an embodiment of the invention with one of the housing extensions [144 of FIG. 1] removed to reveal some drive shaft components of the invention. A midplane [190] is shown in phantom line bisecting the midplane seal [116] of the invention. External surfaces and features of half-housing [121] are exposed in this view which are concealed and shrouded by the omitted housing extension. Another seal [205] runs along the perimeter of the lower well and the lower rims of the half-housings and housing extensions mate with this seal.

A drive shaft passes through both half-housings and is driven by a motor coupled through reduction gearing to be explained elsewhere below. The free end of the drive shaft passes through the half-housing and inserts into a journal [185] which is stabilized by features of the omitted housing extension. The journal may include a transverse pin to take up axial thrust forces which the shaft may pick up from axial reaction forces of the scrubbing mechanism which will also detailed below. The axial thrust is taken up from the journal into the housing extension and thence into the half-housing by the mechanical attachments which couple the housing extension to the half-housing. The drive shaft is also supported by ball bearings which seat in complementary cups pressed in from the internal side of the half-housing. The external surface [209] of one such cup is seen in this figure.

This embodiment of a half-housing also includes a vent [206] which communicates with the cleaning chamber of the machine. Half-housing [122] is also shown in this view with its housing extension [145] attached and these further attached to the lower well. The drive motor is powered by electricity delivered by a power cable having a jack or plug which is inserted into an electrical receptacle [195] or a socket on the machine.

Figure 4:
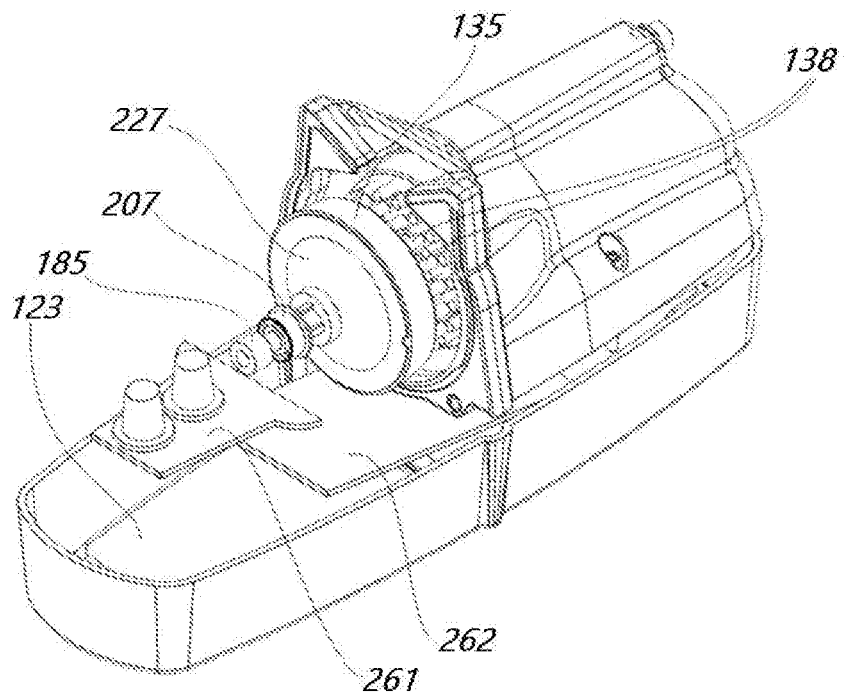
FIG. 4 shows the embodiment of FIG. 3 but with a circuit board shroud also removed to reveal more of the internal components of this portion of this embodiment of the invention.

FIG. 4 shows the embodiment of FIG. 3 but with a circuit board shroud also removed to reveal more of the internal components of this portion of this embodiment of the invention. Coupled to the drive shaft for rotation therewith are two scrubbing discs [135] also called scrubbers. In one set of embodiments these are brushes each having pluralities of bristles arranged in tufts [138] which are made of materials selected for rejection and lack of adhesion to typical plant matter, plant oils, syrups, and saps as well as solvent resistance. The proximity of the discs may be set so that the tuft ends extend into each other or there may be a clearance between them. In a preferred embodiment the discs are deposed symmetrically apart from the midplane of the machine. While cleaning the blades of an inserted pruner, the discs will pick up axial reaction forces Each disc has a support hub [227] which opposes reaction forces picked up from the inserted blades being cleaned which would tend to spread the bristles apart or bend the rims of the scrubbers away from the midplane where scrubbing is taking place.

A support hub may also be called a backing plate, and when affixed to the scrubber by adhesive or mechanical means such as insert molding or overmolding, a backing plate may assist by transferring some of the torque from the drive shaft to the perimeter of the scrubber where its angular velocity is highest. Most of the torque is transmitted into the pruner being cleaned from bristles or contact zones on a scrubber closer to the rotational axis.

The conical shape of the backing plate, when affixed or coupled to a disc membrane such as a scrubber prevents both warping and wobbling of a scrubber in motion with only a portion in contact with a pruner blade being cleaned and the rest of the disc being otherwise free to vibrate. Affixing a backing plate to a plastic injection molded scrubber disc allows the scrubber disc to be designed and molded as a part having more uniform wall thicknesses throughout.

With the half-housing removed, one of two ball bearings [207] which support the drive shaft are seen in this view, as is the journal [185] into which the drive shaft end distal from the drive motor and its reduction gearing is received. The two controls [183 of FIG. 1] are attached to shafts of electrical or electronic components mounted on a first printer circuit assembly (PCS) which may be potentiometers or rotary selector switches or their electrostatic equivalents. A second PCA [262] for other motor control circuits or programmable controllers is also visible within the lower well [123] beneath the cleaning chamber wherein the scrubbers reside.

Figure 5:
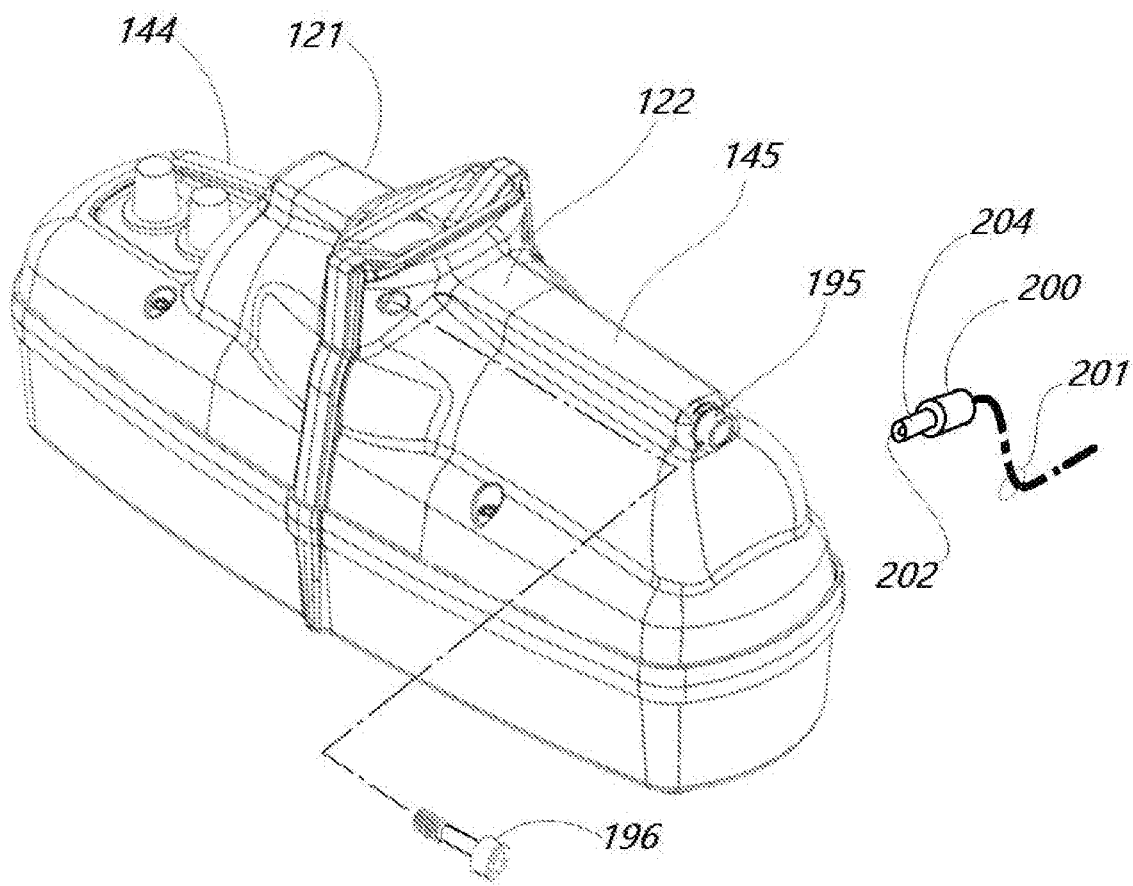
FIG. 5 shows an oblique top right front view of an embodiment in accordance with the invention.

FIG. 5 shows an oblique top right front view of an embodiment in accordance with the invention. Power is delivered to a receptacle [195] on the machine by a power cord [201] terminated by a power plug [200] or a jack which is preferably of a barrel connector design. Both the jack and the plug of a barrel connector system feature one exposed conductor [204] and a second recessed conductor [202.] A benefit of the recessed second conductor is that it is difficult to accidentally create a short between the two conductors.

While there is no universal standard for the nomenclature of barrel power connectors, the electronics industry has drifted towards common usage of the terms "jack," "plug," and "receptacle." The receptacle typically receives power and is mounted in the appliance. The plug is the connector located on the electrical cord and supplies power from a power supply. Using alternate terminology, the component mounted on a power cord may called a plug and it inserts into and supplies power to a mating jack. Depending on the design chosen, the central pin may reside on the appliance side or the power cord side of the connection, and a jack, plug, or the receptacle may be called "male" or "female" depending on which side of the connector interface includes a central conductive pin or the smaller of two intermatable cylindrical contacts. However, other inter-connects such as hermaphroditic connectors are also contemplated within the scope of the invention.

Preferred embodiments include that the exposed conductor [204] of the barrel connector is connected to an electrical ground, and the central pin of the jack or the plug is recessed so that it cannot be accidentally touched by a finger. For connectors having energized conductors, the IEC 61032 safety specification describes a test regimen designed to prove that a reasonably small finger cannot be inserted deep enough into a socket, jack, connector, or receptacle to contact any energized conductors.

The two half-housings [121] and [122] according to this embodiment shown are held together using captive hardware such as captive screws [196] having shortened threaded section and a shank narrower than the major diameter of its threads. When the half housings are disassembled and separated for service the captive screws remain loosely attached to their housings, which inhibits loss of these fasteners. Housing extensions [144] and [145] may also employ captive hardware for their attachment to the lower well of the invention.

Figure 6:
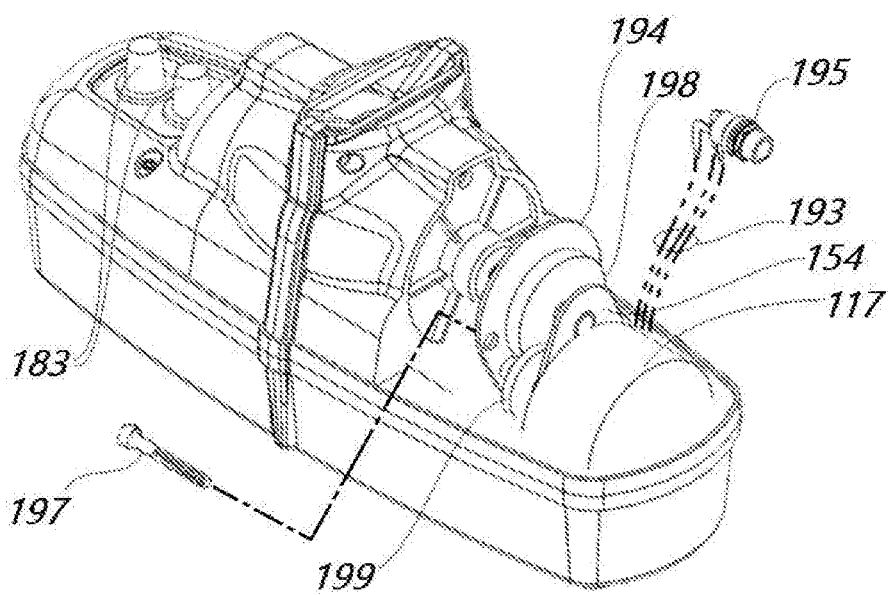
FIG. 6 shows the embodiment of FIG. 5 with a housing extension removed.

FIG. 6 shows the embodiment of FIG. 5 with a housing extension [145 of FIG. 5] removed. The drive motor [117] may be a stepper motor or a DC motor with a gear drive which is commonly a reduction gear train. The gear train is sandwiched between two plates, a first [154] of which affixes to the motor face where its shaft exits its housing, and a second gear train plate [194] on the other side of the reduction gearing from the motor.

According to one particular set of embodiments, successive pairs of larger diameter gears [198, 199] are driven by smaller gears to achieve two stages of reduction between the motor output shaft and the drive shaft upon which the scrubbers reside. The second gear train plate [194] and the housing extension [145 of FIG. 5] may be attached using threaded hardware such as cap screws [197] as shown. According to a simpler embodiment, the power receptacle [195] may deliver power directly to the motor, in which case insertion of the power cord into the receptacle functions as a crude switch. According to preferred embodiments, power is routed to a controller PCA. The controller uses low-current signaling wires to modulate high current circuits which drive the motor. For ease of disassembly, the signaling wires may connect to a PCA by means of pogo pins. Pogo pins are not suitable for high current and it is also desirable to keep the conductive paths for high current to the motor as short as possible between the power receptacle and the motor, especially to reduce power losses due to $I^2R$ heating of the conductors.

According to another alternative embodiment, pogo pins are arranged to hit contact pads of a motor controller PCB so that high current only needs to travel a short distance from where they are generated on the board to the motor coils where they are used. High current conductors may be discrete wires or a flexible printed circuit (FPC) strip. Thus only low-energy signaling wire is needed for lengths of wire running between the motor assembly and the external controls [183] built into the housing.

Power conduits [193] from the power receptacle to the motor and to the one or more PCAs may be a wire harness assembly, a number of discrete wires, a flexible PC (flat conductors within a plastic strip, with the plastic usually being a polyimide such as Kapton® made by the DuPont company) or buss bars. Electricity may also be conducted through selectively plated paths incorporated into the components of the machine, such as the half-housings, housing extensions, and the lower well, should these parts be made of two-shot molded plastics designed for selective plating. According to this sort of embodiment, assembly of the housing components electrically connects the conductive paths between the power receptacle and the PCAs and the motor. Plating via widths and thicknesses determine their current handling capacities. The power conduits in this view are shown in phantom line because there are several available structures within the scope of the invention for delivering motor current and signaling from the power receptacle to the motor and to the one or more PCAs within the machine.

Figure 7:
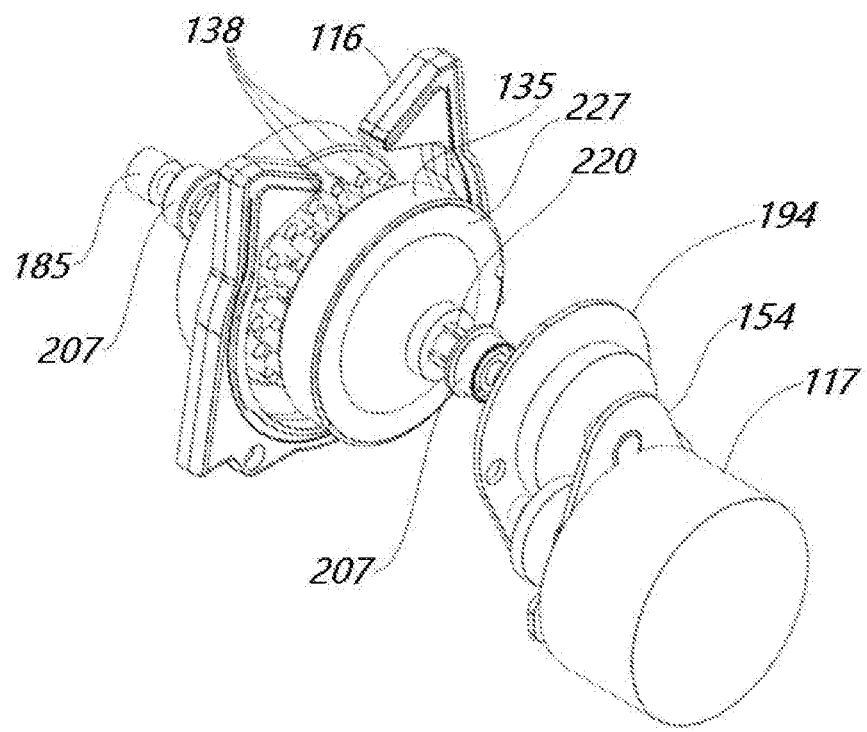
FIG. 7 shows a drive train assembly in accordance with the invention.

FIG. 7 shows a drive train assembly in accordance with the invention, showing the drive motor [117.] Some motors are available which include reduction gearing within their housings and if one such as those are employed in the invention then the reduction gearing and the components between the first and second plates (and thus most of those shown in FIG. 8) may be omitted. A simpler gear train may also be warranted if the purpose is to transfer the axial rotation from the motor axis to a parallel axis established within the housings of the machine.

A first plate [154] of the gear train assembly fastens to the motor face using common hardware. A second plate [194] is spaced apart from the first plate using spacers or threaded hardware. The drive shaft assembly connects to the output shaft of the gear train and is supported by two ball bearings [207] and an additional journal bearing [185] at its end distal from the motor.

The journal bearing may be a Delrin® sleeve or made of a similar generic, low-friction material such as acetal or polyoxymethylene (POM) and which may further comprise Teflon® or polytetrafluoroethylene (PTFE.) Elsewhere in this specification, the word "delrin" written in lower case and as a generic may refer to materials primarily comprising acetal or POM, and "teflon" similarly written as a generic may refer to materials primarily comprising PTFE.

Two brush-type scrubbers [135] are shown with their bristle tufts [138] facing each other in a midplane. The midplane seal [116] is also shown with none of the housing components attached to it. The drive shaft upon which the scrubbers ride is a splined shaft, with one of four splines indicated by [220.]

Figure 8:
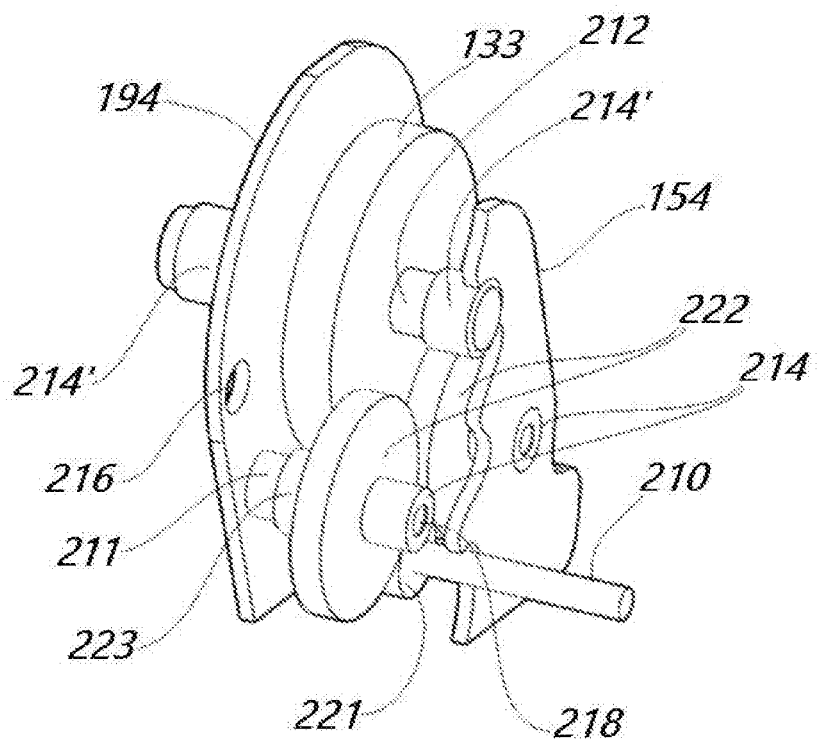
FIG. 8 shows a reduction gear train in accordance with the invention.

FIG. 8 shows a reduction gear train in accordance with the invention. The motor output shaft is coupled to or conjoined to gear train input shaft [210.] The drive shaft of the machine is coupled to the gear train output shaft [212] and in this embodiment two countershafts [218] transmit power from input to output through two parallel and redundant paths of reduction gearing. Depending on the sizing of the gears and their speeds, transmitted torques and face widths, according to one embodiment two paths are required because the transmitted mechanical power exceeds that which one path may bear and so the total load is apportioned between two paths or according to an alternate embodiment one path is of sufficient strength but two paths are provided for redundancy in case components of either one of the paths fail. The countershafts are supported at their ends by hearings [214] and in this embodiment the output shaft is also supported by bearings [214'.] Bearings as used in embodiments of a gear train assembly in accordance with the invention may be journals, bushings of material impregnated with lubricants, such as oil impregnated bronze, or ball bearing or needle bearings.

Gears used in the reduction gear train may be spur gears and preferably comprising modern involute teeth having shaft spacings and other parameters (pressure angles, diametral pitch, addenda and dedenda, and face width) which minimize backlash and chatter. For a pair of meshed gears it is preferable that at least one of them have a prime number of teeth, so as to distribute lubricants and eventual wear evenly. If helical gears are used then the shafts will pick up axial thrust loads from the reaction forces in the gears and the bearings, journals, or bushings which support the shafts must be capable of withstanding these thrust loads.

The input shaft carries a first gear [221] meshed to a second larger gear [222] mounted on a countershaft [218.] The countershaft also carries a third smaller gear which is meshed to a fourth larger gear [133.] Torque from the input shaft to the output shaft is thus passed twice from a smaller gear to a larger gear, this assembly may be called a two-stage reduction gear train. A preferred turn-down ratio is a 4:1 turn-down comprised of two 2:1 reduction gear stages.

Lastly in this figure, second gear train plate [194] includes at least one aperture [216] which may be a threaded hole, which may receive fastening hardware to secure a half-housing or a housing extension to it. Similarly, first gear train plate [154] may also include apertures for securing the motor or other shroud or cowling components or both, to it.

Figure 9A:
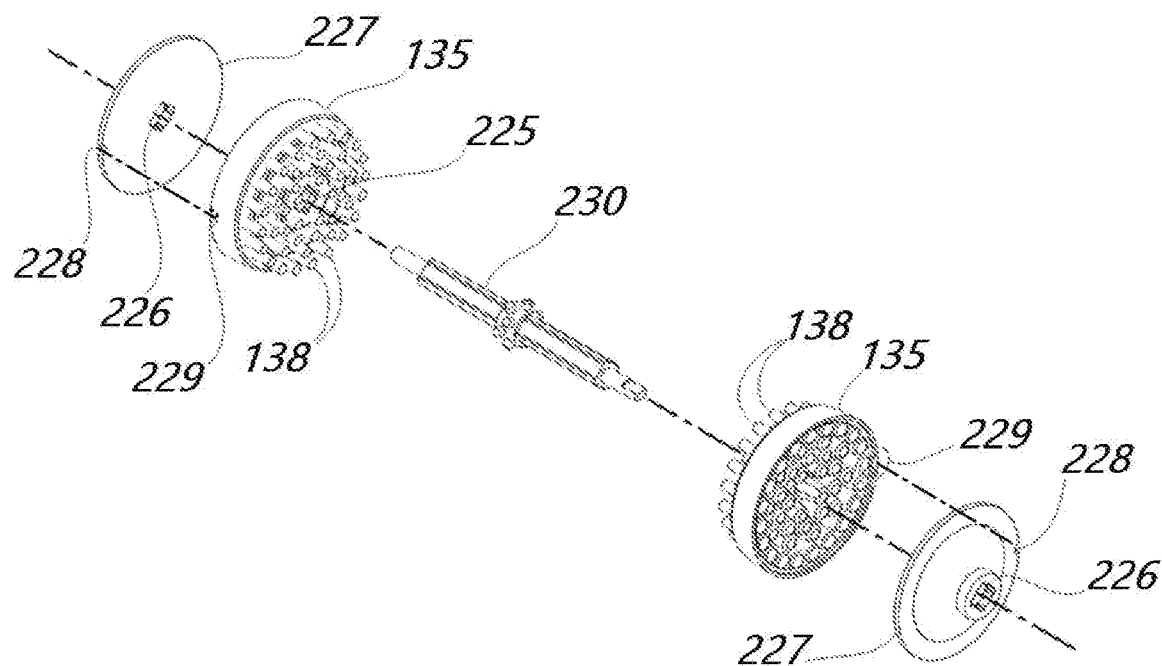
FIG. 9a shows an axially exploded view of an embodiment of a drive shaft and scrubbers in accordance with the invention.

FIG. 9a shows an axially exploded view of an embodiment of a drive shaft [230] and scrubbers [135] in accordance with the invention. In this embodiment the scrubbers are disc shaped brushes having axial bristles gathered in to radial arrays of tufts [138.] Each scrubber disc has affixed to it a support hub [227] as described in FIG. 4. The drive shaft is a splined shaft and the scrubbers have a central aperture [225] complementary to the perimeter of a cross section of the splined drive shaft. The support hubs have a similar central aperture [226] complementary to the drive shaft. According to an alternative embodiment, the rim of the support hub also includes a cut out such as a semicircular cutout [228] and the rear face of a scrubber has a rear projecting protuberance [229] complementary to the cutout so that once the two components are brought together their central apertures become radially aligned. Judicious orientation of radial arrays of tufts with respect to the spline receiving features in a central aperture of a scrubber can enforce that when two scrubbers are installed on the splined shaft so that they face each other, tuft arrays of one scrubber do not directly meet those of the opposed scrubber. Instead, the tuft arrays are 'clocked' with respect to each other so that they interdigitate when brought together.

Figure 9B:
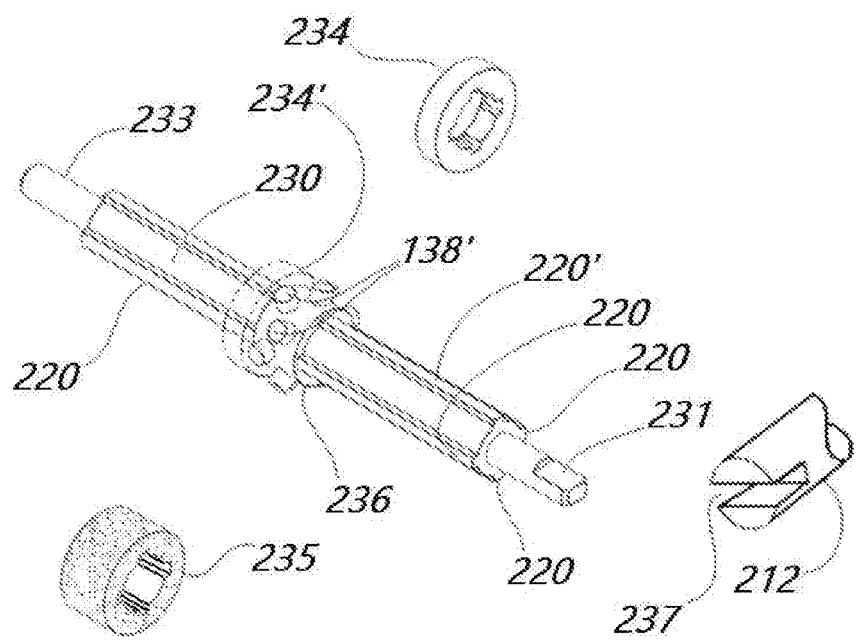
FIG. 9b identifies some components and features of an embodiment of a drive shaft in accordance with the invention.

FIG. 9b identifies some components and features of an embodiment of a drive shaft [230] in accordance with the invention. The drive shaft has a central cylindrical scrubber which may be a barrel [236] having radially projecting tufts [138'] and which may be an integral feature of the drive shaft or a replaceable wear component called a scrubber barrel. According to an alternative embodiment, the scrubber barrel [235] may be a cancellous or spongy material or formed wire wool, impregnated with a binder compound such as an epoxy, or an abrasive compound, or a mixture of both, or a material similar to a scouring pad material called Scotch-Brite®. When assembled, two scrubbers will be spaced apart by the width of the scrubber barrel, but it may also be desired to increase their spacing distance as an adjustment for particular pruners which may have blades also spaced apart. One or more spacers [234] may be installed on the shaft so that they are interposed between the scrubber hub and the scrubber barrel. An installed spacer [234'] is shown in phantom line. Spacers may be stacked on either or both sides of the scrubber barrel section of the drive shaft, and may be of any thickness to allow incremental adjustment of the space between the scrubbers. One preferred spacer thickness is 0.025 inches. Note that while the spacers hold the hubs of the scrubbing disks apart, the tufts of one disk may contact and interfere with the those of the other disk which it faces. According to an alternate embodiment, axial springs behind the scrubber disks push them towards each other. These springs may be coil springs, wave springs, or Belleville (conical washer) springs. An advantageous and optimizable relationship exists between scrubbing surface angular velocity, contact pressure on the surfaces being cleaned, and the duration of this contact.

Although in some embodiments the splines [220] on the drive shaft may all be identical, according to an alternative embodiment at least one spline [220'] is made wider or of a different profile than the rest so that the complementary central apertures of the scrubbers can only be assembled onto the shaft in a predetermined angular orientation. By 'clocking' these apertures, as above, scrubbers can be designed so that tufts of two scrubbers facing towards each other interdigitate when they are juxtaposed.

The drive shaft has a proximal end which may be coupled to a drive motor or may be coupled to an output shaft of a reduction gear train, and a distal end [233.] Both of these ends are preferably devoid of splines or strakes so that they can insert into bearings, journals, or bushings. The proximal end may incorporate a keyway or a flat, or as shown in the figure, two opposed flats called a "double-D" feature [231.] The double-D inserts into a slot [237] milled into a motor shaft or output shaft [212] to receive rotary power. An output shaft having a double-D may be made of 17400, 17600, or 400-series stainless steel, or preferably 420C stainless steel. A double-D shaft end is also called a "PD" shaft end in industry.

Other configurations for drive shafts exist within the scope of the invention. FIG. 9c shows a drive shaft in accordance with the invention having six splines, and FIG. 9d shows a drive shaft in accordance with the invention having eight splines. Besides a drive shaft having a single strake or ridge or a keyway, a preferred minimum number of splines is two, and splines need not be evenly spaced radially. One or more can be 'clocked' with respect to the rest of the array to enforce preferential relative orientations of the scrubber discs. A drive shaft may also be a regular or an irregular polygon such as a hexagonal or octagonal bar or a bar having a square, rectangular, trapezoidal, triangular, or elliptical cross section, or a drive shaft may have a single groove or a plurality of grooves cut into the shaft. One or more grooves or splines within a plurality may be of a different size than the rest so as to enforce preferential relative orientations of the scrubber discs or other components carried by the drive shaft.

FIG. 9e shows an embodiment of a coupling from a motor output or gear train output shaft [218] to a proximal end [232] of a drive shaft [230] in accordance with the invention. The drive shaft includes splines [220] of which, although a drive shaft may have any number of splines, a preferred embodiment has four in quadrature which engage with keyways in the scrubber discs, so that in manufacturing these parts any required draft angles when these parts are molded will have minimal effect on torque transfer from the splines on drive shaft into the keyed apertures of the scrubbers and backing plates.

The proximal end of the drive shaft includes a slot [237'] which may couple to a double-D output shaft, but in the embodiment shown inserts into to an output shaft or motor shaft having a circular cavity [238] at its end. The output shaft has a transverse hole [240] piercing into and out the opposite side of the cavity and a pin [239] may be force-fit into both ends of this hole, residing athwart the cavity. The width of the slot on the drive shaft is complementary to the diameter of the pin. The pin coupling shown may be engineered to be a shear pin of a more ductile material and lower yield strength than the drive shaft or the output shaft so that it may act as a mechanical weak link or 'fuse' between the motor and the cleaning discs to prevent damage to the motor and provide a safety disengage in the event of an accident. One class of accident mitigated by such a mechanical 'fuse' is if foreign matter such as a vine or tendril, or part of a user's garment such as a drawstring, ribbon, loose cuff or sleeve, or part of a user's hair accidentally enters the cleaning chamber. Such strands of material could get wound up by rotating parts within the pruner cleaning mechanism and precipitate further injury, discomfort, or inconvenience.

An alternate set of embodiments also contemplated and within the scope of the invention has a double-D feature on the motor shaft or output shaft, and with the proximal end of the drive shaft having a complementary as seen in FIG. 9b, or the coupling tube or sleeve having a transverse pin as seen in FIG. 9e.

FIG. 9f shows a portion of a half housing [121] or housing extension receiving a bushing or journal [185] for retaining a distal end [233] of a drive shaft in accordance with the invention. In this embodiment the journal may be made of a ductile, low-friction material like delrin or polyethylene such as UHMW or LDPE, and may also be impregnated with or compounded with lubricating materials such as PTFE. Since these materials are soft they are generally less fit for withstanding high forces or thrust loads which the drive shaft may pick up during operation. A transverse pin [253] is passed through a transverse hole [254] in the journal. The journal is assembled into a hollow boss [251] which traps the pin. The pin is made of hard or hardened material so the distal end of the drive shaft may spin against it and the pin may take up thrust loads and transfer them from the shaft into the housing. The housing material is also harder than the journal, and the inner cylindrical wall of the hollow boss may include at least one internal rib or strake [252] to prevent rotation of the journal when it is installed by press fit. According to an alternate embodiment in accordance with the invention, the transverse pin passes through the hollow boss and the journal so that it can be removed for inspection or service replacement. According to another embodiment, the outer surface of the journal has a taper and the inner hollow of the boss has a complementary taper so that the journal will self-lock within the tapered hollow in a similar manner as a tool having a Morse taper fits securely into a complementary taper of a machine tool such as a mill or lathe.

Figure 10A:
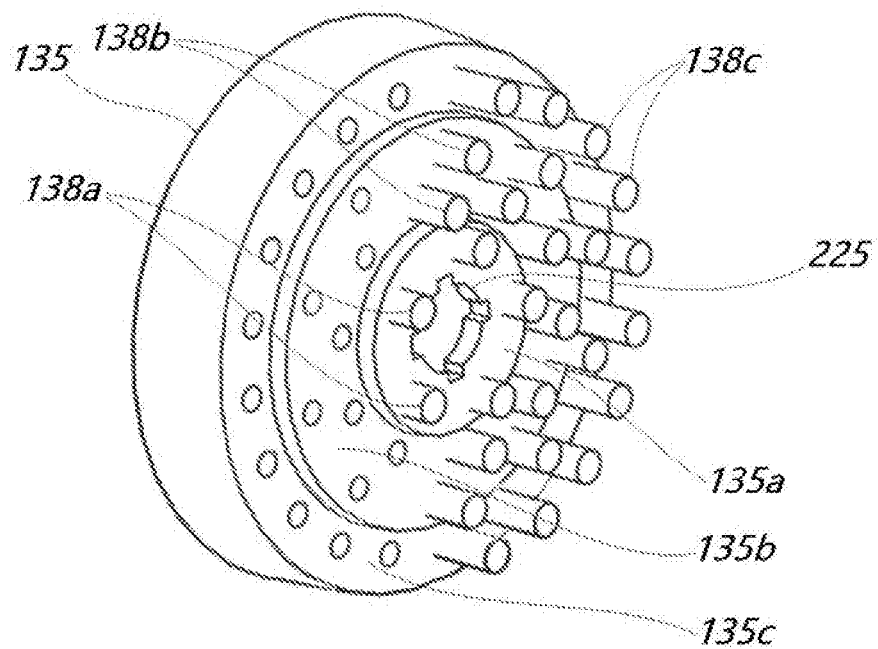
FIG. 10a shows an embodiment of a scrubber in accordance with the invention which is a disc scrubber having bristles arranged into tufts.

FIG. 10a shows an embodiment of a scrubber in accordance with the invention which is a disc scrubber [135] having a central orifice [225] keyed to be complementary to a splined drive shaft, sets of bristles arranged into radial arrays of tufts. This embodiment is a rotary brush scrubber disc in which the bristle tufts are grouped into three annular arrays. The face of the disc is stepped into three annular tiered surfaces [135a,] [135b,] and [135c.] All bristles are cut to length in the same plane so that the outermost tufts have the longest bristles and the innermost bristles have the shortest bristles. The plane defined by the ends of all sets of tufts defines the scrubbing surface of the scrubber. Because each bristle is a cantilever beam, the longest beams around the rim are the most pliant, and the shortest closest to the hub are the stiffest. A three-tiered disc face thus presents tuft sets [135a,] [135b,] and [135c] which become softer as they progress toward the rim.

This arrangement offers two advantages: the first being that outer tufts turn at a faster angular velocity and if made as stiff as the more central tufts, the outer ones would deleteriously pick up most of the burden of retarding torque of the cleaning action of the tufts as they hit the scissor blade and ride up the rake angle of narrow cutting face. The second advantage is that pruners used to cut plants which exude gummy sap tend to acquire more of the residue at their blade tips, which end up closest to the scrubbing disc hubs, so that most of the cleaning power is required at the center hub or cylinder brush. Softer peripheral tufts help concentrate rotational cleaning power to those regions of the scrubbing system in contact with where the pruners are most fouled and need the most cleaning action.

Figure 10B:
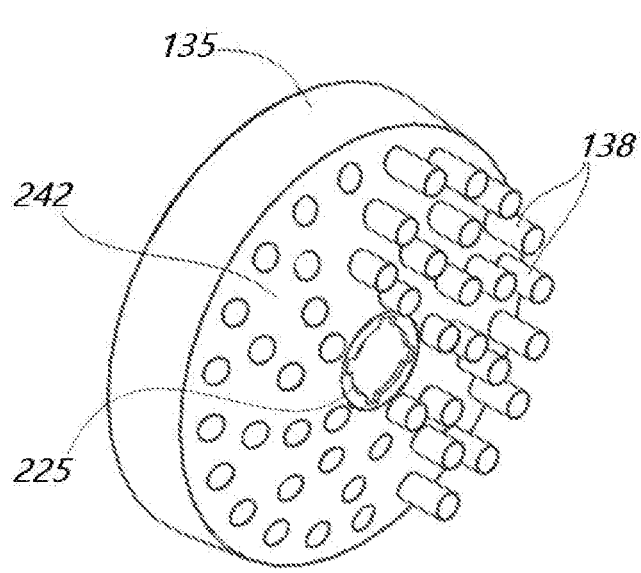
FIG. 10b is an alternate embodiment of a scrubber disc having a conical face.

FIG. 10b shows an embodiment of a scrubber in accordance with the invention which is also a disc scrubber [135] having a central orifice [225] keyed to be complementary to a splined drive shaft, but instead of having stepped faces this embodiment has face which is conical [242.] With all bristles cut to length in the same plane, tufts [138] will be shortest and stiffest near the axis of rotation of the scrubber and its drive shaft, with tufts getting progressively longer and more pliant as they progress toward the rim. Alternatively, besides a conical face, embodiments of a scrubbing disc brush having a bulbous or a spherical face are also contemplated within the scope of the invention. In most of these embodiments, a plurality of bristles, whether arranged in tufts or not, terminate in a plane which defines the scrubbing surface.

Figure 10C:
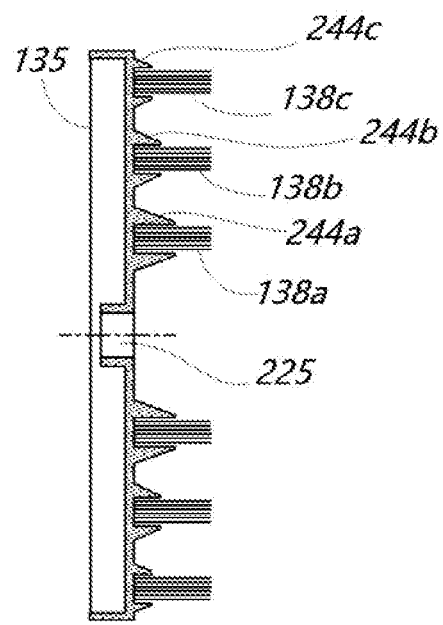
FIG. 10c shows a cross section of another alternative construction for a scrubber in accordance with the invention.

FIG. 10c shows a cross section of another alternative construction for a scrubber [135] in accordance with the invention in which a brush face may be planar but with tufts of bristles [138a, 138b, 138c] surrounded by tubes [244a, 244b, 244c] of increasing heights as they progress toward the center, while the bristle ends are all cut to the same plane. These tubes may also have conical exterior surfaces so that they are thicker at the base or root where they emerge from the brush face, because the bending moments of the cantilevered bristles are greatest at the root.

Figure 10D:
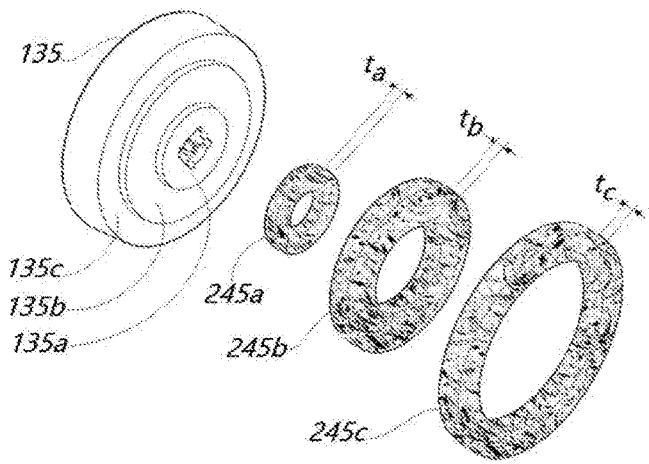
FIG. 10d shows a yet another alternative construction for a scrubber in accordance with the invention.

FIG. 10d shows a yet another alternative construction for a scrubber in accordance with the invention. A blade cleaner for the pruner cleaning machine may be a brush or a pad, and the blade cleaner may be made of cancellous or elastomeric material. In this figure the scrubber [135] has a plurality of concentric tiered annular surfaces [135a, 135b, 135c] and concentric rings of replaceable scrubbing mediums are affixed to these tiered surfaces using an adhesive. The ring mediums are made in increasing thicknesses as they progress from the hub to the rim, so that the outward facing surfaces of the replaceable ring mediums are substantially coplanar. The coplanar surfaces of the ring mediums define the scrubbing surface of this embodiment of a scrubber. Scrubbers having two or more tiers may be fashioned in accordance with the invention though in this figure three tiers are shown.

A typical scrubbing or scouring medium is created with a sparse unwoven polymer such as cellulose, nylon or spun polypropylene fiber, which is then impregnated with use hardening and abrasive materials such as aluminum oxide (alumina) titanium dioxide and bound to the fibers with a resin such as epoxy resins. Although the base polymers remain soft and compliant, their composition with the other materials greatly enhances abrasiveness. The tiered thicknesses of scouring ring mediums may be sufficient for a set of ring mediums to exhibit increasing softness as they progress from the center to the rim, or alternatively rings may be created using softer strands or softer coating on the strands to effect the progressive softness of the assembly. As with the progressively compliant tufts, a system of progressively compliant concentric rings helps transmit torque more evenly across the entire system.

Rings are detached and replaced as they wear out in the machine. Although adhesive is probably the simplest means of adhesion, mechanical fasteners and interlocking features are also contemplated within the scope of the invention, such as sets or radial arrays of pegs molded into a scouring ring which press fit or twist lock into apertures in the scrubbing disc. A twist lock may comprise a peg having a laterally protrusion with an oval peg receiving aperture in the disc face. The cancellous material is compliant to allow rotation of the peg when a twisting force is applied, but will restore the orientation of the peg and its protrusion once the twisting force is released. The pegs are molded into a scouring ring with their protrusions in first orientations, such as all pointing radially inward. The eccentric axes of the oval peg receiving apertures are molded at some angle such as 90°, 120°, or 180° away from the first orientations of the peg protrusions. Each peg is rotated so that its protrusion can pass through the oval hole and then when released the protrusion reverts to its first orientation out of alignment with the contour of the peg receiving aperture, thus attaching the scouring ring to the disc face at that point.

An alternative twist lock comprises molded in pegs having a half-moon end and a transverse slot, with the peg receiving apertures in the disc being half-moon holes or having a chord of material partially occluding the through aperture. A peg is inserted into the aperture and turned so that its transverse slot pinches upon the chord or web of material spanning across the aperture. Friction retains the peg in its locked orientation within the aperture.

Figure 10E:
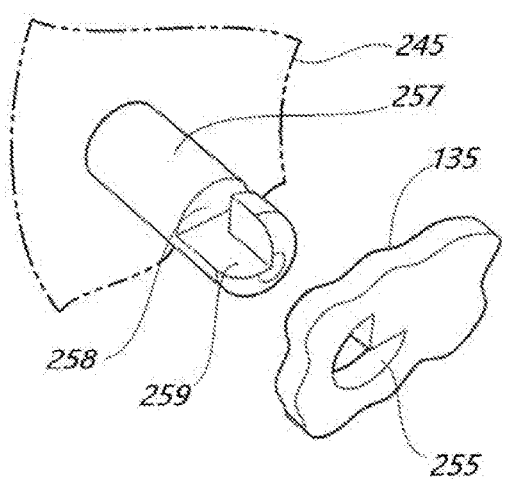
FIG. 10e shows a twist lock for a cancellous scrubber ring medium in accordance with the invention.

FIG. 10e shows another kind of twist lock for a cancellous scrubber ring medium [245] in accordance with the invention. A peg [257] is molded so that a portion of it engulfs the cancellous fiber portion of a replaceable scrubber ring. The tip of the peg has a quadrant section [259] removed, similar to a keyway, which extends to the root of the peg, and communicates with a transverse slot [258.] The scrubber disc [135] has an aperture [255] which is mostly circular and occluded by a quadrant obstruction which may be nicknamed a "pizza slice." The peg is shown in a first position of repose. To insert the peg it is twisted a quarter turn into a second position where its quarter-slice keyway is aligned with the pizza slice and may be inserted through the aperture. Releasing the pin causes the pin to rotate back to its position of repose wherein the pizza slice is received in the transverse slot. According to an alternate embodiment, the width of the slot closely fits and interferes with the pizza slice so that the peg must be turned by force and locks onto the pizza slice. The transverse slot and the pizza slice may include complementary tapered surfaces or a rib or a bump which cooperates with a detent.

Figure 10F:
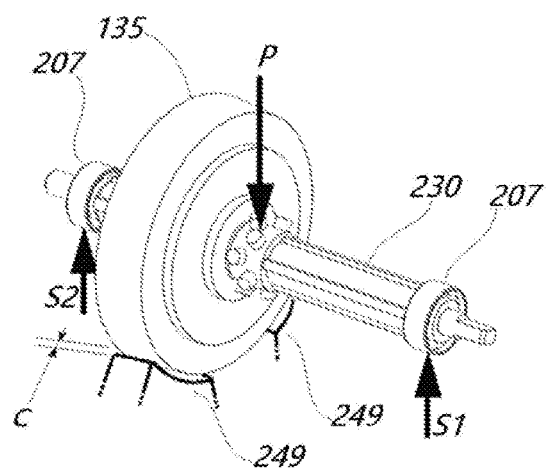
FIG. 10f shows a scrubber fitted onto a drive shaft in accordance with the invention with support journals nearby.

FIG. 10f shows a scrubber [135] fitted onto a drive shaft [230] in accordance with the invention. The drive shaft is supported at its ends by bearings [207.] Although a user can insert a pruner to be cleaned into the machine, let it go, and allow the machine to do its work, other users will commonly hold onto the pruner, especially exerting additional downward pressure [P] which will get picked up by the barrel scrubber if no provision is made to provide physical stops at the entrance to the cleaning chamber to limit the insertion depth of a pruner. Such a user may prefer to feel and control torque being applied for cleaning by the downward force or applying squeezing force on the pruner blades. The downward force is mostly opposed by reaction forces [S1, S2] at the drive shaft bearings, which means that the drive shaft can be considered as a rotating simply supported beam subject to 100% reversing stress and failure models according to Soderberg and Miner equations for cyclic failure for a drive shaft of a reasonably ductile material.

Figure 10G:
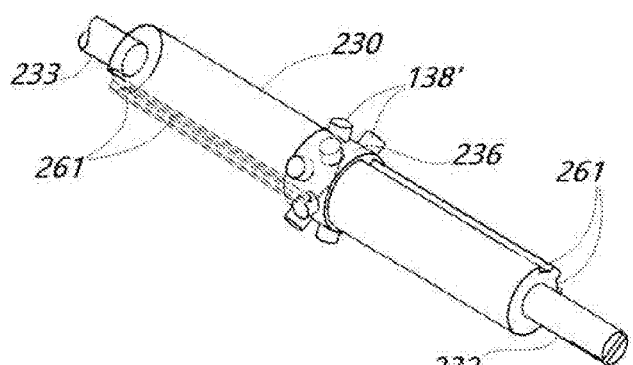
FIG. 10g shows an alternative embodiment of a drive shaft having pairs of grooves for orienting each scrubber carried thereon.

FIG. 10g shows an alternative embodiment of a drive shaft [230] having pairs of grooves [261] for orienting each scrubber carried thereon. The drive shaft has a central cylindrical scrubber which may be a barrel [236] having radially projecting tufts [138'] and which may be an integral feature of the drive shaft or a replaceable wear component called a scrubber barrel. The grooves on the distal portion of the shaft in this view are shown with hidden line features (dashed lines.) Other hidden features are omitted for clarity. The proximal end [232] has a slot for coupling with an output shaft of a gear box, flexible coupling, or a motor. The pairs of grooves extending in opposite directions from the central barrel section may be aligned but in the embodiment shown in this figure they are radially displaced from each other or "clocked," so that scrubber discs having features which engage in these grooves can be designed so that their tufts interdigitate as explained previously. The distal end [233] of the drive shaft is shown as a broken off feature because its end features are not discussed in this figure.

Another safety structure within the scope of the invention is to provide one or more support journals [249] immediately beneath the scrubber discs spaced away from the rim of a scrubber by a small clearance [C.] When a user applies enough downward force to the pruner to bend the drive shaft enough to close the gap between the scrubber and a support journal, the drive shaft is prevented from further bending and the bending stress it carries thus limited. The contact of the rotating scrubber against one or more stationary supports may add rotational drag to the system and cause a change in the noise made by the mechanism in motion, signaling for the user to desist from applying the excessive force, but to protect the drive shaft from excessive bending stress if the user remains unrelenting. More typically, a user will insert a pruning tool with its blades partially open so that while completely inserted the blades pass on opposite sides of the scrubber barrel. The user may then squeeze the pruner handle preferably using light pressure so that the machine can do most of the work, and the use may then then reciprocate the pruner up and down so that the scrubber barrel can clean as much of the cutting regions of the blades possible.

Figure 11:
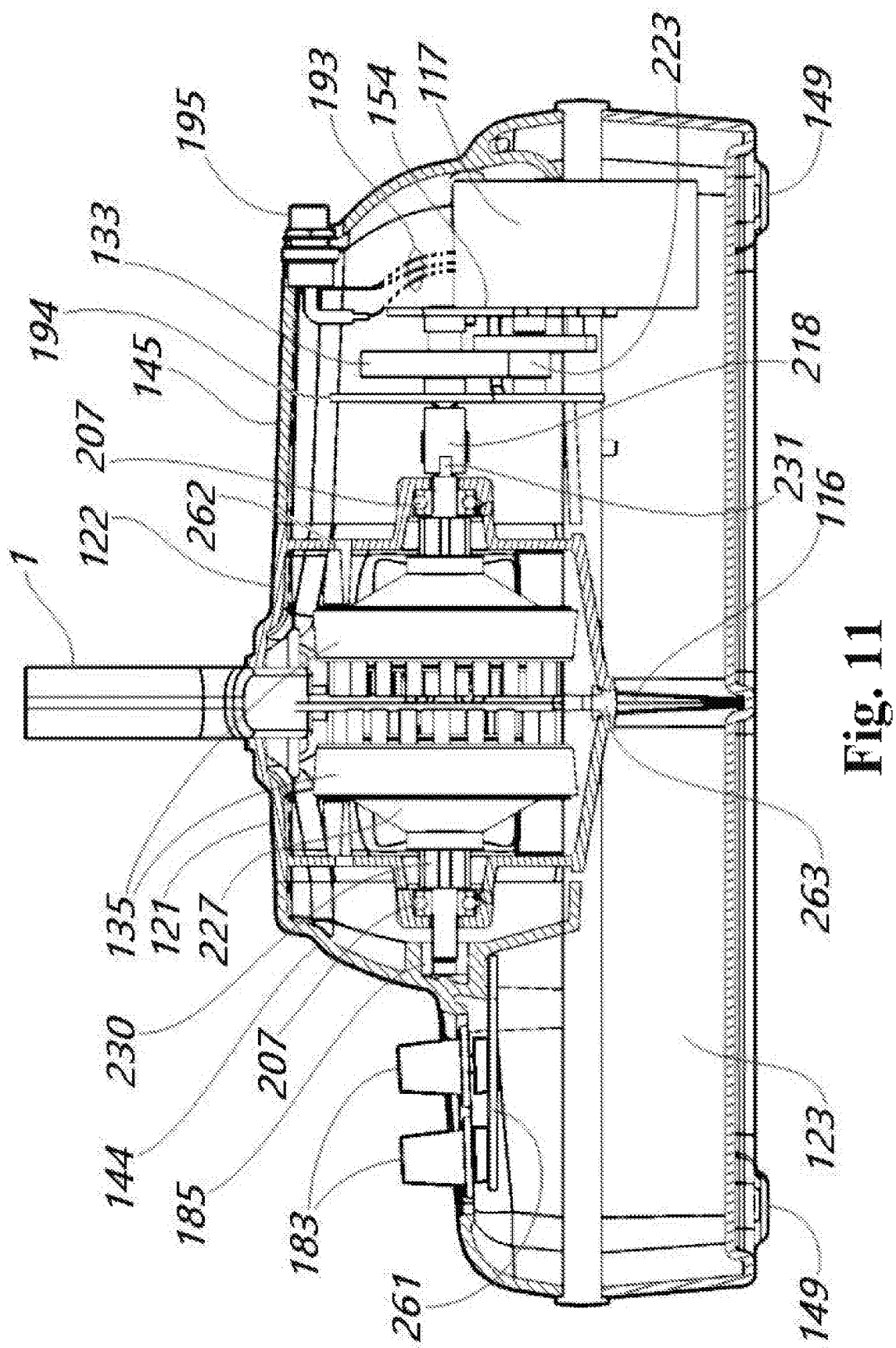
FIG. 11 shows a plan view of an embodiment of a pruner cleaning machine in accordance with the invention, with housing and half housing components shown in cross section.

FIG. 11 shows a plan view of an embodiment of a pruner cleaning machine in accordance with the invention, with housing and half housing components shown in cross section. A pruner [1] is inserted for cleaning, and upon hitting mechanical stops which control and limit its insertion depth, the cutting blades of the pruner reside between two scrubbers [135] having scrubbing surfaces facing each other, which are disc brushes. The pruner receiving orifice defined by features of two abutted half housings [121] and [122.]

Internal features of the half-housings come together to form a reservoir section beneath pruner receiving orifice. The reservoir retains a liquid cleaner selected or created as a solvent for softening and dissolving plant sap, gum, and other sticky stuff which has accumulated onto the pruner and its blades sufficient to impair its use in the field. A midplane seal [116] or gasket disposed between the left and right housings confines the liquid to the reservoir formed between the left and right housings, and prevents its leakage into the volume of the lower well [123] below. Electronics and batteries are housed within this volume, and it is important to prevent the solvent cleaner from contaminating and possibly corroding these components.

A usable housing material is 10% glass-filled polyethylene, and a usable seal material is low density polyethylene (LDPE.) Inward-facing ramps of seal act as a firm but slightly compliant stop for pruners to limit depth of insertion of a pruner. They also stabilize the pruner and its blades in a favorable orientation with respect to the rotating scrubbers, and their firm hold and enforced orientation of the pruners may advantageously discourage a user from walking the scissors about within the aperture. A preferred method of cleaning a pruner with this machine is to insert the pruners and hold them in place until status lights indicate that the cleaning cycle is complete.

Many solvents are available which are effective for removing gum or sap from fouled pruner blades. A usable pruner cleaner liquid is a mixture of d-limonine oil and 95% ethyl alcohol. Pure ethyl alcohol is hygroscopic and will usually absorb atmospheric moisture until it is diluted to 96% or less. Other essential oils may be added to the cleaning solvent as fragrances, for astringent properties, or as a preservative.

When the reservoir is adequately filled with cleaning solution, the circular path of the scrubbers dips at least their outermost tufts of bristles into the solution. The surface of the cleaning disc facing the blades to be cleaned may alternatively comprise a sponge, an abrasive coating, an abrasive or cancellous material, or in a best mode, bristles which can uniformly dispersed or grouped into tufts which emerge from the body of the disc. When spinning, a portion of a disc or its bristles which dip into the cleaning solution at speed will pick up the solution and fling it off by centripetal force so as to asperse all surfaces of the pruner which are received within the invention. It is desirable that the pruner receiving orifice and the lead-in ramps conform closely to the pruner so as to prevent cleaning solution from being sprayed outside the machine. It is therefore also preferred to use a pruner sensing mechanism or a sensor or circuit as a switch to keep the motor of the machine unpowered if a pruner is not present to plug the aperture in the cap of the machine. The switch resides within the housing and energizes a motor after a pruner is received into an aperture in the housing or the cap. A cleaning disc is also called a scrubber disc in this specification.

A "switch" in this specification may also be a sensor capable of detecting the proximity or presence or absence of a pruner inserted into the cap of the invention, thus a "switch" can also include a magnetic sensor, a Hall effect sensor, or a reed switch or a wand connected to a momentary contact mechanism so that displacement of the wand or the reed by the presence of a pruner received in a pruner receiving orifice of the machine closes an electrical circuit or sends an electrical signal to a circuit. The switch may also be a proximity switch or a photovoltaic switch whereby a light beam shines across a portion of the cleaning chamber to a photoreceptor, and when pruners are inserted, the light beam is broken and the presence of a pruner is thereby detected.

Using electronic sensors to switch the motors on and off can include more sophisticated or more egalitarian criteria, so that each pruner to be cleaned receives a timed scrubbing, or that cleaning proceeds until the applied torque generated by the motor falls below a predetermined value indicating that enough gummy material has been removed from the pruner for it to be deemed fit for service. Using this shutoff criterion would conserve energy by scrubbing more heavily gummed up blades for a longer period of time. Bypassing a user decision of how long to clean each particular pruner might also obviate subconscious implicit biases based on irrelevant factors or user inexperience with how long the cleaning machine takes to clean a particular set of pruners.

In addition to a proximity switch, the invention may include a timing circuit whereby the motor is energized after a predetermined delay following insertion of a pruner into said aperture has elapsed. The timing circuit may energize the motor for a predetermined duration or duty cycle following insertion of a pruner into said aperture. After the duration has elapsed, the timing circuit de-energizes the motor. Also, to discourage overuse of the motor after a sufficient cleaning operation has elapsed, a reset circuit can be included in the motor control circuitry so that a de-energized motor remains de-energized until the inserted pruner, which has been cleaned once already, is at least partially extracted from said aperture. The user can inspect the results and begin an additional cleaning cycle if necessary, but the motor will stop after a while in the event that a user inserts a pruner to be cleaned and then leaves the machine unattended.

Especially but not exclusively with stepper motors, software or a programmable controller may run the motor for predetermined durations and may also alternate the speed and rotational direction of the brushes. A best mode operation includes four runs of 5 seconds each, alternating in forward and reverse directions. Another preferred mode runs the scrubbers for 3-5 seconds in each direction, 2-5 times. High torque, low speed stepper motors are preferable in the invention because less reduction gearing is required. A stepper motor having a 1.8 step or a 0.9 step is also contemplated within the scope of the invention. A preferred rotational speed may reside within 60 to 250 rpm, which may be optimized based on parameters comprising quantity and placement of tufts, rotational speed of the scrubbers, and contact pressure and contact time. These motors are controllable by software rather than pulse width or voltage or current variations, and some are available with a controller chip built into motor housing.

Returning to FIG. 11, half-housings [121] and [122] are substantially symmetrical and come together to define a center plane and form a cleaning chamber with a reservoir section for cleaning fluid. The housings rest upon and are attached to a lower well [123] also called a base or a tray. The bottom of the tray includes feet [149] for stability. The feet may include felt or rubber pads. Housing extensions [144] and [145] are attached to their respective half-housings. The tray may also include internal or external strengthening ribs for torsional rigidity or for acting as runners for improved mold flow.

Disassembly of the half housings from the tray to access scrubbing components for inspection and maintenance is designed to be easy and straightforward. Removal of the housing extensions, which would expose circuit boards, the motor and its reduction gearing, and other components which are generally not user-serviceable is discouraged by being designed to be non-intuitive and non-obvious, or by using tamper-resistant hardware which require special tools.

Scrubbing discs and their backing plates [227] ride upon a splined drive shaft [230.] The backing plates stabilize the scrubber rims and control warp and wobble, and distribute the transfer of torque from the drive shaft to the scrubbers. The ends of the drive shaft are supported by ball bearings [207] pressed into the half-housings. The housing extension opposite the drive motor [117] includes a journal [185] which receives the drive shaft end distal from the motor.

The machine is operated by potentiometers or rotary switches which are mounted to a printed circuit card [261.] The motor controls [183] adjust durations and duty cycles for a selected scrubbing regimen. The mounting plate for the motor controls may also include one or more status lights which indicate stages of a cleaning process and may also indicate other status or information such as battery charge, power connected (pilot lamp,) low battery, or malfunctions or reasons for non-operation or system halts, such as a housing assembly interlock being open, a scrubber wear criterion has been triggered (such as a scrubber thickness is worn and unacceptable) low cleaning fluid level, maintenance recommended due to service hours exceeded, or other conditions requiring the attention of a user or a qualified service technician. Since one preferred operating mode is to have the motor drive the scrubbers in pulses of alternating directions, an indicator scheme including green for 'in process,' red for 'done' is also contemplated within the scope of the invention. The status indicators may be located anywhere on the machine but are preferably located near the control knobs.

The half-housings may optionally include vents [262] or drains [263] for pressure relief of solvent vapors and capture of cleaning fluid which may migrate past the ball bearings and any shaft seals for retaining the fluid within the cleaning chamber. Observation of such leakage is an indication that maintenance or inspection of the machine is warranted.

The motor is operably connected to a drive shaft by means of reduction gearing either incorporated within the motor housing or deposed between the motor output shaft and the drive shaft. In the embodiment shown, a two-stage reduction gear train is deposed between two plates, a first [154] of which is affixed to the motor housing and a second [194] which is attached to a housing extension. The reduction gear train has pairs of meshed spur gears including a small driving gear [223] meshed to a larger driven gear [133] having in this case a 2:1 turn down ratio. Other reduction ratios are contemplated within the scope of the invention.

Lastly in this figure, a power receptacle [195] receives a plug from a power cord, and power wiring [193] feeds a motor control circuit board and supplies high current power to the drive motor. The output shaft [218] of the reduction gearbox in this embodiment shown is slotted so that it mates with a double-D stub [231] on the proximal end of the drive shaft.

Additional and further variations are contemplated within the scope of the invention. For example, shaft seals to retain cleaning fluid within the cleaning chamber may be deposed on either or both sides of the ball bearings and on the interior or exterior of the housings which retain these bearings. Additional pairs of ball bearings may be incorporated along the drive shaft for additional support against bending moments. Although ball bearings are shown and described, journals, lubricated bushings, and needle bearings are also within the scope of the invention.

Although bristles and tufts are depicted as generally residing within cylindrical volumes perpendicular to scrub brush faces, tufts and bristles may be angled in radial directions or angles to have a forward or reverse rake angle with respect to their rotational direction on a scrubbing disc for improved scrubbing effect of the primary shear surface of a pruner blade. A preferred embodiment angles the bristles so that their contact allows them to strike the cutting surface of a pruner blade and then ride up the positive rake angle of the pruner blade and pass along the side face of the pruner blade. A recirculating pump for cleaning fluid is also contemplated within the scope of the invention, which may be activated by a certain amount of insertion force applied to the scissors by a user, much like driver-actuated windshield applications of windshield cleaner for a vehicle.

Figure 12:
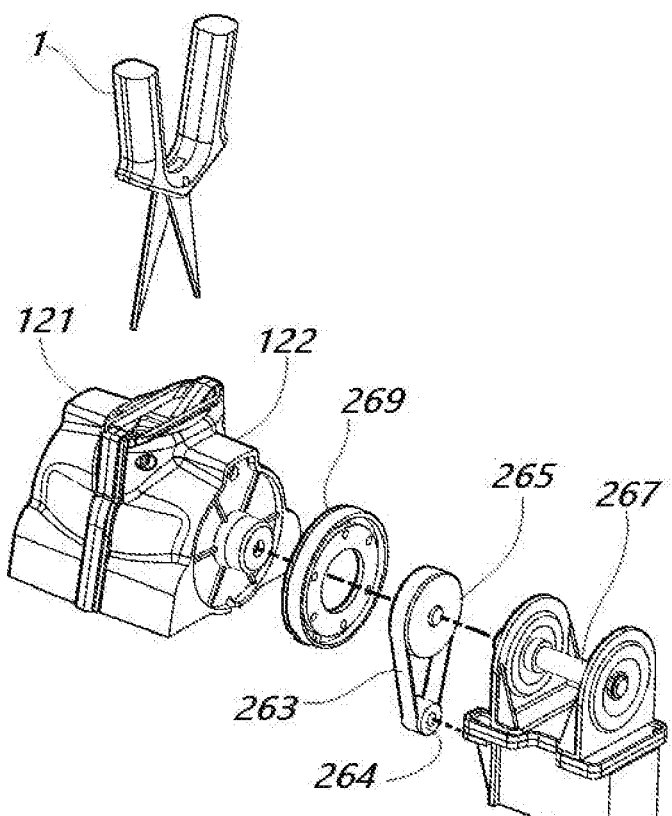
FIG. 12 shows an embodiment in accordance with the invention having a belt drive operating between sheaves mounted on a motor output shaft and a countershaft.

Although various embodiments as shown use gearing, other means of power transmission from a motor shaft to a drive shaft of the invention are also contemplated within the scope of the invention, such as sprocket and chain drives and belt drives operating between sheaves mounted on shafts and countershafts. FIG. 12 shows an embodiment in accordance with the invention having a belt drive [263] operating between a sheave [264] mounted on a motor output shaft and another sheave [265] mounted on a countershaft [267.] The counter shaft couples to the drive shaft of the invention through an over-running clutch [269] or a slip clutch. In this view most of the housing components are omitted except for the two half housings [121] and [122,] and a pruner [1] is depicted above the conjoined half housings for reference. In this figure the belt drive acts as a reduction mechanism, and in FIGS. 7 and 8 the gear train is another embodiment of reduction mechanism operably coupled between a motor and a drive shaft.

Figure 13:
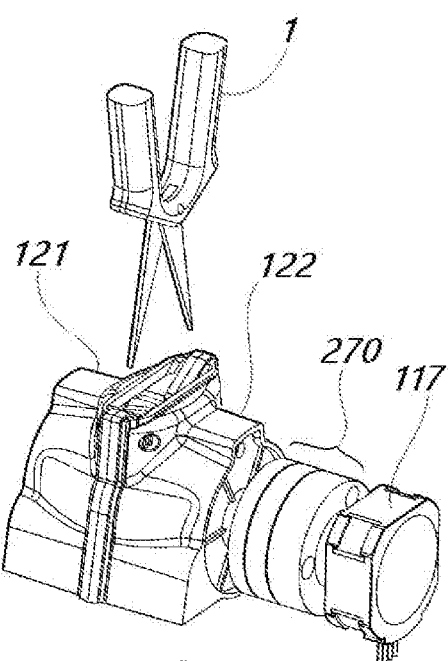
FIG. 13 shows an alternate embodiment in accordance with the invention, having a compact stepper motor and a shaft coupling which includes an elastomeric element.

FIG. 13 shows an alternate embodiment in accordance with the invention, having a compact stepper motor [117] and a flexible shaft coupling assembly [270] which includes an elastomeric element to induce rotational hysteresis. As a general term, hysteresis means a lag between input and output in a system upon a change in direction. As in the previous figure, most of the housing components are omitted except for the two half housings [121] and [122,] and a pruner [1] is depicted above the conjoined half housings for reference.

Figure 14:
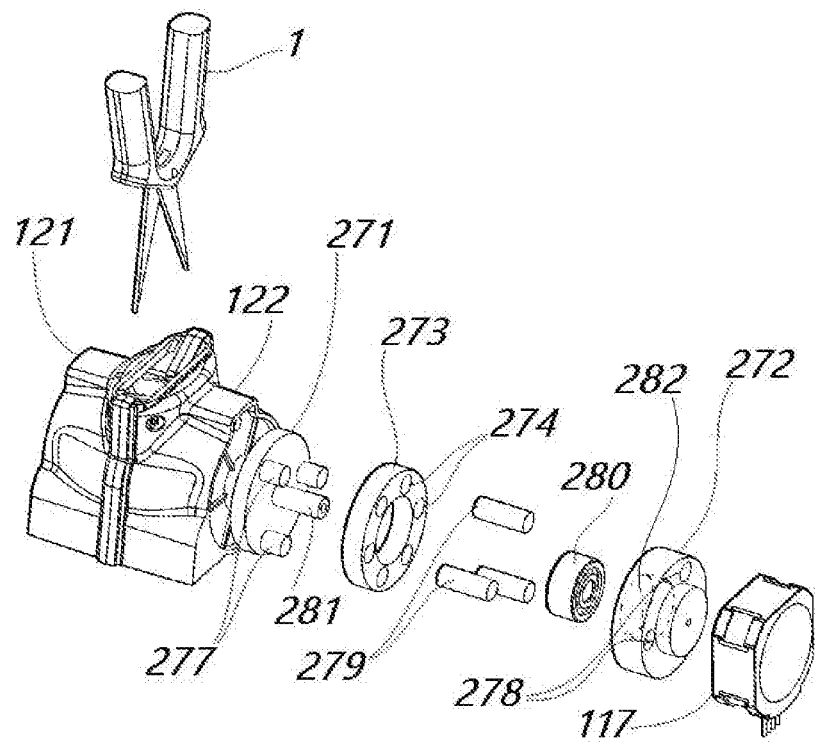
FIG. 14 shows the embodiment of FIG. 13 but with the components of the flexible shaft coupling assembly exploded.

FIG. 14 shows the embodiment of FIG. 13 but with the components of the flexible shaft coupling ("flex coupling") assembly exploded for discussion. As in previous figures, most of the housing components are omitted except for the two half housings [121] and [122,] and a pruner [1] is depicted above the conjoined half housings for reference. The flex coupling resides between the drive motor [117] and the drive shaft which resides inside the housing halves. The motor couples to a driver plate [272] which includes a radial array of apertures [278] which receive drive rods [279.] On the other side of the flex coupling, the drive shaft for the scrubbers connected to a shaft [281] within the flex coupling which also resides within a bearing [280] designed to withstand bending moments, such as a needle bearing or a double-row ball bearing. The driver plate includes a pocket [282] which receives at least a portion of the bearing. The shaft is coupled to a driven plate [271] with apertures that receive drive rods [277.] Both sets of drive rods interdigitate and are received into apertures [274] of a flex plate [273] which is made of an elastomeric material which may include materials such as such as Viton® FKM, TPR, buna-n, urethane, EPDM rubber, or a material such as Zectron® which comprises a synthetic polymer polybutadiene as well as hydrated silica, zinc oxide, stearic acid, and other ingredients.

The flex plate provides radial and torsional compliance so that when the driver plate accelerates angularly, the flex plate compresses while storing energy and introducing a lag between the rotational velocities of the driver plate and the driven plate. Thus, step changes in the speed or direction of the driver plate create a delayed and ringing step response in the speed or direction of the driven plate. A more complete description of system dynamics follows in FIGS. 18a and 18b.

Figure 15:
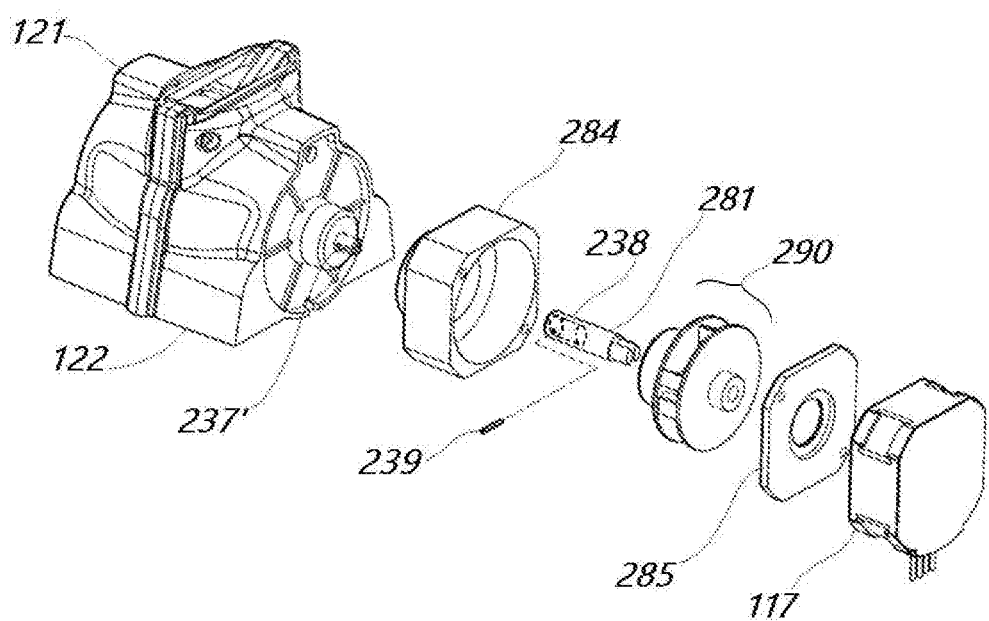
FIG. 15 shows an alternative embodiment in accordance with the invention for a flex coupling operating between a motor and a drive shaft carrying scrubbers.

FIG. 15 shows an alternative embodiment in accordance with the invention for a flex coupling operating between a motor [117] and a drive shaft carrying scrubbers. As in previous figures, most of the housing components are omitted except for the two half housings [121] and [122] which are depicted for reference. The flex coupling in this embodiment comprises an output shaft [281] which couples to the drive shaft by means of features similar to those seen in FIG. 9e. The output shaft includes a circular cavity [238] at its end. The output shaft has a transverse hole piercing into and out the opposite side of the cavity, and a pin [239] may be force-fit into both ends of this hole, residing athwart the cavity. The width of the slot [237'] on the drive shaft is complementary to the diameter of the pin. As described previously, the material of the pin may be selected so that this coupling acts as a "fuse" or intentional fail point to decouple the drive shaft from the motor. These components and a subassembly [290] of rotationally compliant components reside in a casing comprising a flex coupling outer housing [284] and a cover plate [285.]

Figure 16A:
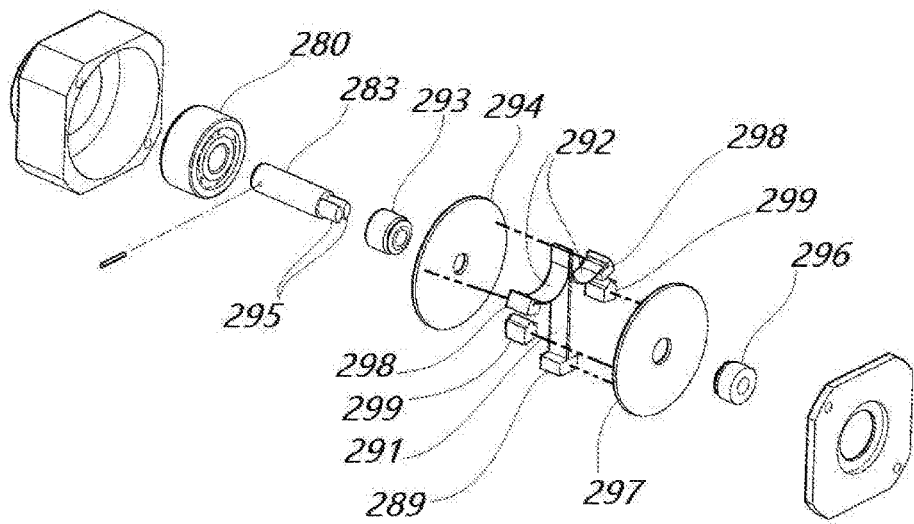
FIG. 16a shows an exploded view of the embodiment of the flex coupling shown in FIG. 15.

FIG. 16a shows an exploded view of the embodiment of the flex coupling shown in FIG. 15, with the rotationally compliant members and other components visible. The motor is coupled to a driver plate [297] and its hub [296] which may be an integral portion of the plate, or as shown in this figure it may be a discrete part welded, swaged, or overmolded onto the driver plate. Similarly a driven plate [294] has a permanently affixed hub [293] united to an output shaft [283.] The output shaft passes through a hearing [280] before extending beyond and outside of the outer housing.

Phantom lines are included to illustrate which components are united with which. The driver plate is united with a driver spring mount block [289] and two driver bumper stops [299.] The driven plate is united with two tension spring pockets [298.] A driver spring [291] which is a substantially straight strip of a flexible and durable material such as blue spring steel or clock spring steel is united with the driver spring mount block [289.] The output shaft includes two pins [295] which extend past and bestride the driver spring. Two arcuate spring members called horse shoe springs [292] are united to the driver spring at its end which is opposite the driver spring mount block. The free ends of the horse shoe springs are each received into a groove in a tension spring pocket.

Figure 16B:
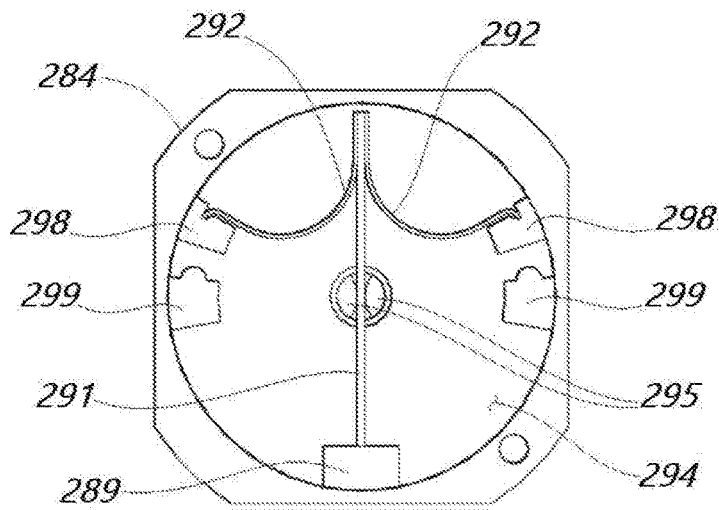

FIG. 16b shows an end view of the driven plate [294,] springs, mount block, bumper stops, and other flex coupling components housed within the outer housing [284] of the embodiment shown in FIG. 16a. A bumper stop, a mount block, or a tension spring pocket may comprise a compressible or deformable material such that it may store energy as a cantilever beam deflected from the plate to which is it is attached. Effective materials include but are not limited to Viton® FKM, TPR, buna-n, urethane, EPDM rubber, or a material such as Zectron® which comprises a synthetic polymer polybutadiene as well as hydrated silica, zinc oxide, stearic acid, and other ingredients.

In start-up operation, the driver plate spins and through the driver spring mount block [289,] bends the driver spring [291] a quarter to around a half-turn before the driven plate [294] becomes entrained into motion. The initial torque applied to accelerate the driven plate is received from the driver spring through its contact areas between the pair of pins [295.] Further deflection of the driver spring and rotational system lag curls a first of the two horse shoe springs [292] so that it imparts increasing additional torque to the driven plate through the tension spring pocket [298] united to the driven plate. Even more deflection of the driver spring and rotational system lag allows a gap between the other tension spring pocket and its nearby driver bumper stop [299] to close and curl the second horse shoe spring so that it imparts increasing additional torque to the driven plate through its tension spring pocket which is also united to the driven plate.

The escalating sequence of torsional deflection of soft torsional spring elements allows significant rotational lag of up to an entire rotation (360° lag) between the motor input and the output shaft, and stores a significant amount of torsional energy in the flex coupling of this embodiment. As will be seen in the discussion of FIGS. 18a and 18b, system energy storage and rotational lag between the input and the output shaft creates significant overshoot and ringing behavior which effect rotationally oscillating or pulsed scrubbing action of the scrubbers against the pruner blades being cleaned, making the process rapid, convenient, and efficacious. This overshoot behavior and hits benefits of energy savings and enhanced scrubbing action are also available using an embodiment as described shown in FIGS. 14 and 15. A rotational lag of a half-turn up to a full turn also serves to wind up the system, and drags fluid from bottom of reservoir to the upper regions or contact between the scrubbers and the pruner blades being cleaned, so that cleaning does not begin with a dry start which is both a waste of cycle time and may produce excessive and unwanted wear on the scrubbers. According to an alternative embodiment in accordance with the invention the selection of spring stiffnesses may also allow the horseshoe springs to snub the oscillation amplitude of the system when operating in rotational hysteresis.

Figure 17:
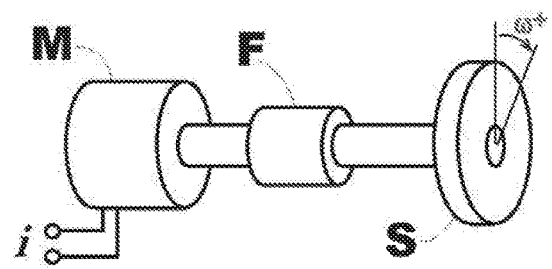
FIG. 17 is a stylized representation of a motor, a flex coupling, and a scrubber of the invention.

FIG. 17 is a stylized representation of a motor [M,] a flex coupling [F,] and a scrubber [S] of the invention. The motor is supplied with current [i] and rotates the scrubber at a rotational velocity [ω.] These variables shall be used in the following two FIGS. 18a and 18b to describe relationships between input current and scrubbing rotations in accordance with the invention. An ideal condition occurs when while the elastomeric components of a flex coupler are uncompressed, such as when a leaf spring is in its natural unflexed state, then at the same time the driver and driven plates are rotating at same speed. This condition effects an optimal scrubbing effect on the pruner blades being cleaned, in both forward and backward rotations, and assures that a continual supply of fresh cleaning solvent is delivered to the working area, which may especially include the zenith of the cylindrical volume in which cleaning and scrubbing action is occurring. Furthermore, a series of reversing scrubber movements over the pruner blades causes the bristles or scrubbing material to stand up, dig into, and harrow accumulated gunk rather than simply wiping over or undesirably burnishing the gunk into the surface of the tool which makes the fouling material much harder to remove. According to a preferred embodiment, tufts encountering a blade or blade edge are oriented at a positive rake angle with respect to the surface they are about to clean, so that they delve aggressively to cleave and displace the material to be removed.

Figure 18A:
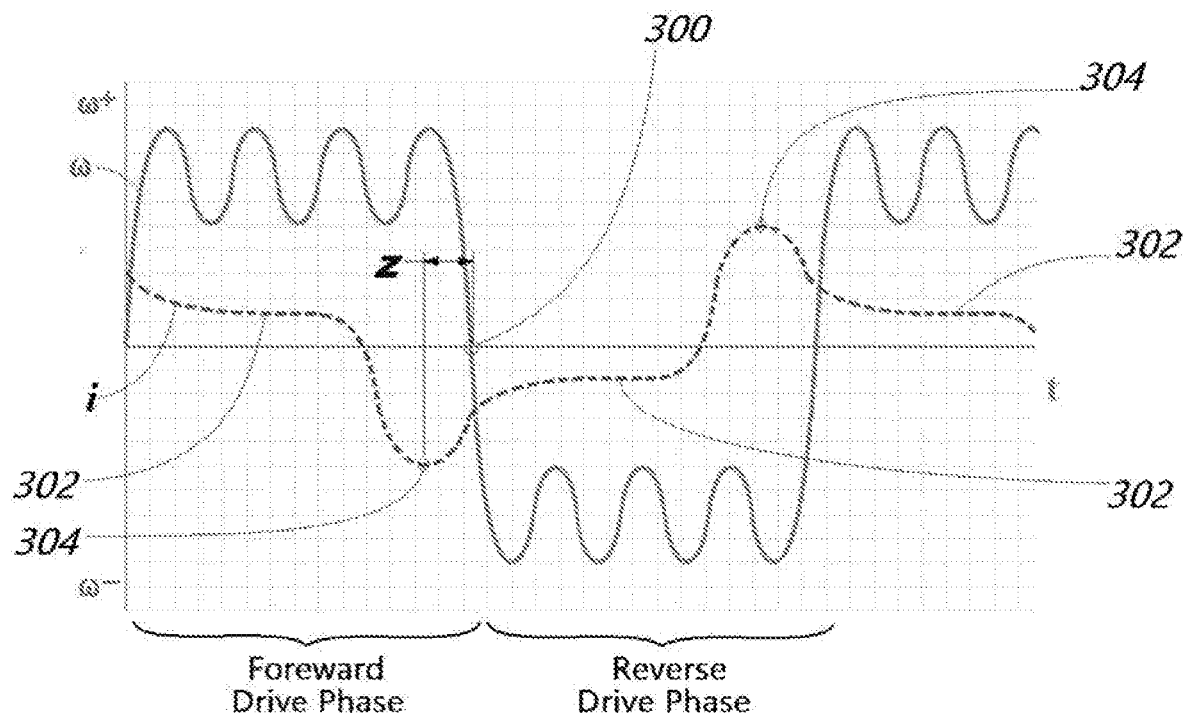
FIG. 18a shows a plot over time of a relationship between a motor input current and scrubbing rotation which occur in accordance with the invention.

FIG. 18a shows a plot over time [t] of a relationship between a motor input current [i] (dashed line) and a scrubbing rotation [ω] (solid line) which occur in accordance with the invention. Although a typical, simple reversing motor can be driven by a reversing square wave of applied current, the flexible coupling included in the invention utilizes electrical energy more efficiently by producing pulsed or locally reversing scrubbing actions which clean pruner blades much more effectively than sets of steady-state rotational scrubbing runs in alternating directions. The synergistic exchange of kinetic energy between the rotating scrubbers and the torsional energy storage components in the flex coupling establishes a proportional relationship between the high maximum start-up torque of a stepper motor at the instant the angular velocity of the scrubbers passes through zero, which is also the instant of maximum deceleration of rotating scrubbers during a reversal of direction, such as when moving from a forward drive phase to a reverse drive phase. This relationship is analogous to a forcing function applied at resonance to a linearly oscillating spring-mass system, and also develops the greatest amount of output scrubbing power for the least amount of energy applied as current consumed by the motor.

In a mode of operation illustrated in FIG. 18a, the ringing effect produced by the step response of a flex coupling creates a forward drive phase in which rotational velocity [ω] of the scrubber oscillates within a range of a high and a moderate forward direction as a first local steady state, followed by a reverse drive phase, where the scrubber angularly decelerates to a stop [300] and continues accelerating to ring within a range of a high and a moderate reverse rotation as a second local steady state oscillation. Applied current is maintained at low steady value during dwells [302] of steady state oscillation. Note that the instant of zero rotational motion [300] of the system may also be the maximum angular acceleration or the system.

High motor current only needs to be applied at peak intervals [304] to reverse the rotating system components, and current and energy are conserved during the dwell periods [302,] where the current need only supply the energy lost to friction of the scrubbers while cleaning pruner blades. Rotational lag in the flex coupling also means that maximum rotational accelerations [300] in either direction will lag the peak applied current [304] for that upcoming drive phase by a time interval or a delay [z.]

Figure 18B:
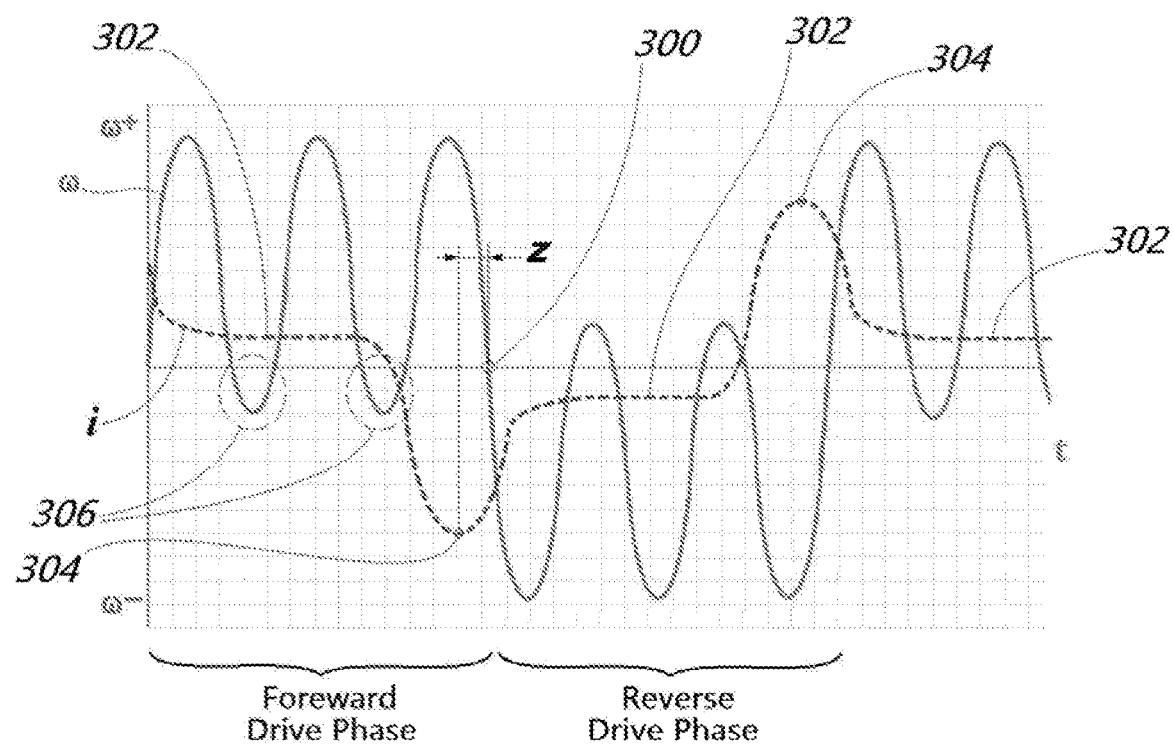
FIG. 18b shows a plot over time of another relationship between a motor input current and scrubbing rotation which occur in accordance with the invention.

FIG. 18b shows a plot over time [t] of another relationship between a motor input current [i] and a scrubbing rotation [ω] which occur in accordance with the invention which is a preferred mode of operation. According to this mode, the amplitude of the ringing effect produced by the step response of the flex coupling creates a forward drive phase in which rotational velocity [ω] of the scrubber oscillates between peaks of a high forward direction and short periods of retrograde motion [306] as a first local steady state, followed be a reverse drive phase, where the scrubber angularly decelerates to a stop [300] and continues accelerating to ring between a high reverse rotation and short periods of retrograde motions as a second local steady state oscillation. As in the previous mode, applied current is maintained at a low steady value during dwells [302] of steady state operation in which high motor current only needs to be applied at peak intervals [304] to reverse the rotating system components, and current and energy are conserved during the dwell periods, where the current need only supply the energy lost to friction of the scrubbers while cleaning pruner blades. Rotational lag in the flex coupling also means that maximum rotational accelerations [300] in either direction will lag the peak applied current [304] for that upcoming drive phase by a time interval or a delay [z.] In the event or embodiment where the rotational velocity of an output shaft of a flex coupling never exceeds the absolute value of a maximum rotational velocity of an input shaft, then the flex coupling may also act as a reduction mechanism.

Other embodiments and variants also reside within the scope of the invention. For example, a flexible coupling may comprise one or more spiral clock springs, concentric and radially spaced apart if more than one, which on forward acceleration tighten up and may optionally tighten their coils down to a solid mass and bind, and then relax during dwell periods. If operating within a cylinder which rotates with a driver plate, then the reverse mode will expand the spiral spring or springs so that they lock against the inner wall of the cylinder. The linear equivalent of this motion is compression of a helical spring to its solid height. In an embodiment having more than one spiral spring, they are radially spaced similar to the multiple thread starts on a multiple thread drive. The radially spaced array of spirals will wind down in concert on acceleration to form a radially solid bound mass.

In another optional operating mode, the brushes may be run in one or both directions during cleaning and after a cleaned pruner has been removed from the machine. Additionally, if the motor is a programmable motor such as a multiple-pole stepper motor, it may be programmed to slip by one or a number of steps, to detect a jam condition stopping or excessively slowing down the drive shaft, or may include a current limiter to prevent damage by allowing a step to slip. This event can be logged in a diagnostics file, and electronic controller software can also count the number of steps slipped per cleaning run or per hour or on any other basis as a predictor for signaling that scrubbers have become worn, or that a maintenance interval has been exceeded. Another programmable response to detection of an excess number of slipped steps is to lower or limit allowable motor current to protect it and its electronics. According to yet another mode of operation, the parameters of programmable stepper motor software are actively modified in response to extremes of torque, current, velocity, or fluctuations in these parameters such as those which would be analogous to tool chatter in a rotary machining operation. Another embodiment in accordance with the invention includes a rotary encoder to confirm rotational performance within predetermined system tolerances, or to compare motor rotation commands to the actual system rotation response such that discrepancies can be detected and logged, and alerts or modifications to system operating parameters can be effected in response. Alerts can be annunciated tones such as by speaker or piezoelectric buzzer, or a pre-recorded message.

In yet another example of rotational hysteresis, the drive shaft with its scrubbing discs may be first rotated counter-clockwise about one half to one revolution to pick up fluid, then reverse direction to move clockwise for about 5 degrees, then reverse again counterclockwise for 10 degrees, then 5 degrees clockwise, et cetera such that the scrubbing discs precess about 5 degrees counterclockwise with every reversal of direction. This operating mode continually exposes freshly cleaned bristles which deliver fresh cleaning solvent to the pruner blades being cleaned. Another option runs the motor for four or five seconds between each reversal of current, which will drive rotational reversals of the scrubbing system to occur at a time delay 'z' following each reversal of driving current 'i' applied to the motor. Thus in a 10 to 12 second cleaning regimen, as each freshly cleaned tuft goes past the edge of a pruner blade it returns to its free state and flicks off material accumulated during its passage over a blade surface.

While certain features and aspects have been described with respect to exemplary embodiments, one skilled in the art will recognize that numerous modifications are possible. Also, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems. Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently and in summary, although many exemplary embodiments are described above, it will be appreciated that the invention is intended to cover all modifications and equivalents within the scope of the following claims.

What is claimed is:

1. A pruner cleaning apparatus comprising first and second and half-housings conjoined to define a center plane,
    a cleaning chamber, and
    a pruner receiving orifice, said pruner receiving orifice configured to orient a blade surface of a pruner received therein at an angle between 0° and 40° inclusive relative to said center plane,
    a seal disposed between said first and second half-housings,
    a drive shaft, a portion of which passes through said cleaning chamber,
    two scrubbers, each having
        a central aperture complementary to said drive shaft, and
        a scrubbing surface, with said scrubbers coupled to said drive shaft for rotation therewith and oriented so that their scrubbing surfaces face each other,
    a scrubber barrel disposed between said two scrubbers, and
    a motor operably coupled said drive shaft.

2. The pruner cleaning apparatus of claim 1, wherein said motor is operably coupled to said drive shaft through a reduction mechanism.

3. The pruner cleaning apparatus of claim 1, further comprising a power receiving receptacle and a printed circuit board, with power passing from said receptacle to said printed circuit board through a pogo pin.

4. The pruner cleaning apparatus of claim 1, wherein at least one of said half-housings further comprises a drain.

5. The pruner cleaning apparatus of claim 1, wherein said drive shaft further comprises at least one spline.

6. The pruner cleaning apparatus of claim 1, wherein said scrubber barrel further comprises bristles arranged into tufts.

7. The pruner cleaning apparatus of claim 1, wherein at least one scrubber further comprises bristles arranged into tufts.

8. The pruner cleaning apparatus of claim 7, wherein a plurality of said bristles terminate in a plane which is said scrubbing surface.

9. The pruner cleaning apparatus of claim 1, wherein at least one of said scrubbers further comprises tiered annular surfaces.

10. The pruner cleaning apparatus of claim 1, wherein at least one of said scrubbers further comprises a surface selected from the set of surfaces consisting of a spherical surface and a conical surface.

11. The pruner cleaning apparatus of claim 1, wherein at least one scrubbers comprises cancellous material.

12. The pruner cleaning apparatus of claim 1, wherein said drive shaft is supported by at least one bearing which is selected from the set of bearings consisting of:
    a ball bearing, a journal bearing, and a needle bearing.

13. The pruner cleaning apparatus of claim 1, wherein said drive shaft further comprises an end having a double-D.

14. The pruner cleaning apparatus of claim 1, wherein said drive shaft further comprises an end having a transverse slot which receives a transverse pin retained in a sleeve.

\* \* \* \* \*